US009333956B2

United States Patent
Watanabe

(10) Patent No.: US 9,333,956 B2
(45) Date of Patent: May 10, 2016

(54) BRAKE FORCE CONTROL APPARATUS FOR VEHICLE AND BRAKE FORCE CONTROL METHOD FOR VEHICLE

(75) Inventor: Yoshinori Watanabe, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 22 days.

(21) Appl. No.: 13/884,782

(22) PCT Filed: Nov. 24, 2011

(86) PCT No.: PCT/IB2011/002806
§ 371 (c)(1),
(2), (4) Date: May 10, 2013

(87) PCT Pub. No.: WO2012/069916
PCT Pub. Date: May 31, 2012

(65) Prior Publication Data
US 2013/0245910 A1    Sep. 19, 2013

(30) Foreign Application Priority Data
Nov. 25, 2010    (JP) .................... 2010-262836

(51) Int. Cl.
*B60T 8/176*    (2006.01)
*B60T 7/04*    (2006.01)
(Continued)

(52) U.S. Cl.
CPC .............. *B60T 8/176* (2013.01); *B60T 7/042* (2013.01); *B60T 8/1755* (2013.01); *B60T 8/1761* (2013.01);
(Continued)

(58) Field of Classification Search
CPC ..... B60T 8/1755; B60T 8/176; B60T 8/1761; B60T 8/1766; B60T 8/268; B60T 8/4872; B60T 8/885; B60T 8/92; B60T 8/26; B60T 7/00; B60T 7/12
USPC ................. 701/78, 79; 303/187–189
See application file for complete search history.

(56) References Cited

U.S. PATENT DOCUMENTS 5,125,483 A * 6/1992 Kitagawa ............... B60L 7/003
                                                    188/1.11 E
5,558,415 A    9/1996 Buschmann et al.
(Continued)

FOREIGN PATENT DOCUMENTS

JP    07 509421    10/1995
JP    08 301092    * 11/1996
(Continued)

OTHER PUBLICATIONS

International Search Report Issued Sep. 11, 2012 in PCT/IB/02806 Filed Nov. 24, 2011.

*Primary Examiner* — Fadey Jabr
*Assistant Examiner* — Aaron L Troost
(74) *Attorney, Agent, or Firm* — Oblon, McClelland, Maier & Neustadt, L.L.P

(57) ABSTRACT

A brake force control apparatus includes a diagonal two-system brake device and performs front-rear wheel distribution control of brake force by individually controlling the brake pressure of the left and right rear wheels so as to obtain a target relationship between a wheel speed of the left and right rear wheels and the front wheels during braking. It is determined whether or not a difference in wheel speed between one wheel of one system and one wheel of the other system or a difference in wheel speed between the other wheel of the one system and the other wheel of the other system exceeds a threshold. When the threshold is exceeded, the reduction of brake pressure by the front-rear wheel distribution control of brake force is not performed with respect to a rear wheel with a lower wheel speed from among the left and right rear wheels.

17 Claims, 15 Drawing Sheets

(51) Int. Cl.

| | |
|---|---|
| *B60T 8/1755* | (2006.01) |
| *B60T 8/1766* | (2006.01) |
| *B60T 8/26* | (2006.01) |
| *B60T 8/48* | (2006.01) |
| *B60T 8/88* | (2006.01) |
| *B60T 13/66* | (2006.01) |
| *B60T 13/68* | (2006.01) |
| *B60T 17/22* | (2006.01) |
| *B60T 8/1761* | (2006.01) |
| *B60T 8/92* | (2006.01) |

(52) U.S. Cl.
CPC .............. *B60T 8/1766* (2013.01); *B60T 8/26* (2013.01); *B60T 8/268* (2013.01); *B60T 8/4872* (2013.01); *B60T 8/885* (2013.01); *B60T 8/92* (2013.01); *B60T 13/662* (2013.01); *B60T 17/221* (2013.01); *B60T 2270/403* (2013.01)

(56) References Cited

U.S. PATENT DOCUMENTS

| | | | | |
|---|---|---|---|---|
| 5,788,345 | A * | 8/1998 | Sakane et al. | 303/146 |
| 6,203,122 | B1 | 3/2001 | Ehmer et al. | |
| 6,238,018 | B1 * | 5/2001 | Sugimoto | B60T 8/1764 |
| | | | | 303/146 |
| 6,292,733 | B1 * | 9/2001 | Sugiyama et al. | 701/76 |
| 6,338,017 | B1 | 1/2002 | Kato et al. | |
| 2001/0054843 | A1 * | 12/2001 | Schmidt | B60T 8/1755 |
| | | | | 303/122.13 |
| 2006/0043790 | A1 * | 3/2006 | Spieker | 303/122 |
| 2008/0177495 | A1 * | 7/2008 | Gold | 702/127 |

FOREIGN PATENT DOCUMENTS

| | | |
|---|---|---|
| JP | 2000 511130 | 8/2000 |
| JP | 2000 335389 | 12/2000 |

\* cited by examiner

BRAKE FORCE CONTROL APPARATUS FOR VEHICLE AND BRAKE FORCE CONTROL METHOD FOR VEHICLE

BACKGROUND OF THE INVENTION

1. Field of the Invention

The invention relates to a brake force control apparatus for a vehicle that performs front-rear wheel distribution control of brake force by individually controlling the brake pressure of the left and right rear wheels so as to obtain a target relationship between the slip degree index value of the left and right rear wheels and the slip degree index value of the front wheels during braking. More particularly, the invention relates to a brake force control apparatus and a brake force control method that perform front-rear wheel distribution control of brake force in a vehicle having a brake device provided with a brake pressure control system for the left front wheel and right rear wheel and a brake pressure control system for the right front wheel and left rear wheel.

2. Description of Related Art

A brake force control apparatus that performs front-rear wheel distribution control of brake force is available. For example, the below-described Japanese Patent Application Publication No. 8-301092 (JP-A-8-301092) describes a brake force control apparatus that performs front-rear wheel distribution control of brake force by controlling the brake force of the rear wheels so that the wheel speed of the rear wheels does not exceed the wheel speed of the front wheels during braking. In particular, in the brake force control apparatus described in JP-A-8-301092, the brake device of the front wheels is determined to have failed and the front-rear wheel distribution control of brake force is prohibited when the deceleration of the vehicle during braking is less than a predetermined value or when the difference in deceleration between the front and rear wheels does not have a maximum value (local maximum value).

Deceleration of vehicle and deceleration of wheels is affected by changes in loading conditions of the vehicle and changes in road surface gradient. Therefore, when failure determination of a brake device is based on deceleration of vehicle or deceleration of wheels, the failed brake device is sometimes determined to be normal and the front-rear wheel distribution control of brake force is sometimes implemented inappropriately. Conversely, a normal brake device is sometimes determined to have failed and the necessary front-rear wheel distribution control of brake force is not performed.

In particular, special attention should be paid to the front-rear wheel distribution control of brake force in the event of a failure when the brake device is a hydraulic brake device of a diagonal two-system (the so-called X piping) type, that is, a brake device provided with a brake force control system for the left front wheel and right rear wheel and a brake force control system for the right front wheel and left rear wheel.

For example, let us consider a case in which a failure has occurred in a brake force control system for the left front wheel and right rear wheel and the brake pressure of the left front wheel and right rear wheel has not assumed a necessary value. In such a case since the brake force of the right front wheel and left rear wheel is controlled normally, the wheel speed of the right front wheel is lower than the wheel speed of the left front wheel, and the brake pressure of the left and right rear wheels is individually controlled by reduction so as to obtain the predetermined relationship between the wheel speed of the left and right rear wheels and the wheel speed of the left front wheel. Since the brake pressure of the right rear wheel is inherently a low pressure due to the failure, the brake pressure of the left rear wheel is reduced comparatively significantly by the reduction control and the brake force of the left rear wheels is also reduced.

As a result, the difference between the sum of brake forces of the right front and rear wheels and the sum of brake forces of the left front and rear wheels increases, the excess yaw momentum in the right turn direction caused by the difference in brake force between the left and right wheels increases and travel stability of the vehicle decreases. Further, since the brake force of the entire vehicle decreases, the deceleration of the vehicle is less than the deceleration desired for the driver.

Therefore, in the front-rear wheel distribution control of brake force of a vehicle having a hydraulic brake device of a diagonal two-system type, whether or not the brake device has failed should be accurately determined and the increase in excess yaw momentum and decrease in vehicle deceleration should be prevented even when either of the systems has failed. In a vehicle having a hydraulic brake device of a diagonal two-system type, the abovementioned problems are encountered when the front-rear wheel distribution control of brake force is performed by individually controlling the brake pressure of the left and right rear wheels.

SUMMARY OF THE INVENTION

The invention provides a brake force control apparatus and a brake force control method that accurately detect the presence of a failure in a brake device and control the brake force of the rear wheels so that the increase in excess yaw momentum and decrease in vehicle deceleration are inhibited when a failure of one system is detected.

The first aspect of the invention resides in a brake force control apparatus for a vehicle that has a brake device provided with a brake pressure control system for a left front wheel and a right rear wheel and a brake pressure control system for a right front wheel and a left rear wheel, and performs front-rear wheel distribution control of brake force by individually controlling the brake pressure of the left and right rear wheels so as to obtain a target relationship between a slip degree index value of the left and right rear wheels and a slip degree index value of the front wheels during braking. The brake force control apparatus includes an inhibition unit configured such that, when either of a difference in slip degree index value between one wheel of one of the systems and one wheel of the other of the systems and a difference in slip degree index value between the other wheel of the one system and the other wheel of the other system exceeds a threshold for the difference, the inhibition unit inhibits a reduction of brake pressure by the front-rear wheel distribution control of brake force with respect to a rear wheel of the system including a wheel with a lower wheel speed from among the two wheels for which the difference in slip degree index value exceeds the threshold for the difference.

The second aspect of the invention resides in a brake force control apparatus for a vehicle that has a brake device provided with a brake pressure control system for a left front wheel and a right rear wheel and a brake pressure control system for a right front wheel and a left rear wheel, and performs front-rear wheel distribution control of brake force by individually controlling the brake pressure of the left and right rear wheels so as to obtain a target relationship between a slip degree index value of the left and right rear wheels and a slip degree index value of the front wheels during braking. The brake force control apparatus includes an inhibition unit configured such that, when a sign of a difference in a slip degree index value between one wheel of one of the systems and one wheel of the other of the systems is different from a sign of a difference in a slip degree index value between the other wheel of the one system and the other wheel of the other system, the inhibition unit inhibits a reduction of brake pressure by the front-rear wheel distribution control of brake force with respect to a wheel with a lower wheel speed from among the left and right rear wheels.

The third aspect of the invention resides in a brake force control apparatus for a vehicle that has a brake device provided with a brake pressure control system for a left front wheel and a right rear wheel and a brake pressure control system for a right front wheel and a left rear wheel, and performs front-rear wheel distribution control of brake force by individually controlling the brake pressure of the left and right rear wheels so as to obtain a target relationship between a slip degree index value of the left and right rear wheels and a slip degree index value of the front wheels during braking. The brake force control apparatus includes an inhibition unit configured such that, when a difference between a sum index value of slip degree index values of two wheels of one of the systems and a sum index value of slip degree index values of two wheels of the other of the systems exceeds a threshold for the sum index value, the inhibition unit inhibits a reduction of brake pressure by the front-rear wheel distribution control of brake force with respect to a wheel with a lower wheel speed from among the left and right rear wheels.

The fourth aspect of the invention resides in a brake force control method for a vehicle that uses a brake device provided with a brake pressure control system for a left front wheel and a right rear wheel and a brake pressure control system for a right front wheel and a left rear wheel to perform front-rear wheel distribution control of brake force by individually controlling the brake pressure of the left and right rear wheels so as to obtain a target relationship between a slip degree index value of the left and right rear wheels and a slip degree index value of the front wheels during braking. With the brake force control method for a vehicle, if either of a difference in slip degree index value between one wheel of one of the systems and one wheel of the other of the systems and a difference in slip degree index value between the other wheel of the one system and the other wheel of the other system exceeds a threshold for the difference, a reduction of brake pressure by the front-rear wheel distribution control of brake force is inhibited with respect to a rear wheel of the system including a wheel with a lower wheel speed from among the two wheels for which the difference in slip degree index value exceeds the threshold for the difference.

The fifth aspect of the invention resides in a brake force control method for a vehicle that uses a brake device provided with a brake pressure control system for a left front wheel and a right rear wheel and a brake pressure control system for a right front wheel and a left rear wheel to perform front-rear wheel distribution control of brake force by individually controlling the brake pressure of the left and right rear wheels so as to obtain a target relationship between a slip degree index value of the left and right rear wheels and a slip degree index value of the front wheels during braking. With the brake force control method for a vehicle, if a sign of a difference in a slip degree index value between one wheel of one of the systems and one wheel of the other of the systems is different from a sign of a difference in a slip degree index value between the other wheel of the one system and the other wheel of the other system, a reduction of brake pressure by the front-rear wheel distribution control of brake force is inhibited with respect to a wheel with a lower wheel speed from among the left and right rear wheels.

The sixth aspect of the invention resides in a brake force control method for a vehicle that uses a brake device provided with a brake pressure control system for a left front wheel and a right rear wheel and a brake pressure control system for a right front wheel and a left rear wheel to perform front-rear wheel distribution control of brake force by individually controlling the brake pressure of the left and right rear wheels so as to obtain a target relationship between a slip degree index value of the left and right rear wheels and a slip degree index value of the front wheels during braking. With the brake force control method for a vehicle, if a difference between a sum index value of slip degree index values of two wheels of one of the systems and a sum index value of slip degree index values of two wheels of the other of the systems exceeds a threshold for the sum index value, a reduction of brake pressure by the front-rear wheel distribution control of brake force is inhibited with respect to a wheel with a lower wheel speed from among the left and right rear wheels.

Where a failure occurs in one system or the other system, the difference in slip degree index value between one wheel of the one system and one wheel of the other system, or the difference in slip degree index value between the other wheel of the other system and the other wheel of the one system increases. A failure can be determined to have occurrence in either of the systems when either of the difference in slip degree index value exceeds the threshold for the difference.

According to the above-described first or fourth aspect, when either of the difference in slip degree index value exceeds the threshold for the difference, the reduction of brake pressure caused by the front-rear wheel distribution control of brake force is inhibited with respect to a rear wheel of the system including a wheel with a lower wheel speed from among the two wheels for which the difference in slip degree index value exceeds the threshold for the difference.

Further when a failure occurs in the one system or the other system, the sign of the difference in slip degree index value between one wheel of the one system and one wheel of the other system is different from the sign of the difference in slip degree index value between the other wheel of the other system and the other wheel of the one system. Therefore, where the signs of the difference between two slip degree index values differ from each other, it can be determined that a failure has occurred in either of the systems.

According to the above-described second or fifth aspect, when the signs of the two differences between slip degree index values differ from each other, the reduction of brake pressure caused by the front-rear wheel distribution control of brake force is inhibited with respect to a wheel with a lower wheel speed from among the left and right rear wheels.

Where a failure occurs in the one system or the other system, the difference between a sum index value of slip degree index values of two wheels of the one system and a sum index value of slip degree index values of two wheels of the other system increases. Therefore, where the difference between the two sum index values of slip degree index value exceeds a threshold for the sum index value, it can be determined that a failure has occurred in either of the systems.

According to the above-described third or sixth aspect, when the difference between the two sum index values of slip degree index value exceeds a threshold for the sum index value, the reduction of brake pressure caused by the front-rear wheel distribution control of brake force is inhibited with respect to a wheel with a lower wheel speed from among the left and right rear wheel.

With the above-described brake force control apparatus for a vehicle, the presence of a failure can be accurately determined so that the determination result is not affected by changes in loading conditions of the vehicle and changes in road surface gradient. Further, when a failure has occurred in either of the systems, the rear wheel of the system including the wheel with a lower wheel speed from among the two wheels for which the difference in slip degree index value or the wheel with a lower wheel speed from among the left and right rear wheels is the rear wheel of the system in which no failure has occurred. Therefore, where a failure has occurred, the reduction of brake pressure of the rear wheel of the normal system can be inhibited on the basis of accurate determination of failure occurrence. As a result, the brake force of the rear wheels can be controlled so that the increase in excess yaw momentum and decrease in vehicle deceleration are inhibited.

In the abovementioned brake force control apparatus for a vehicle, the wheel speed may be a wheel speed from which the effect of turning radius has been excluded.

With the abovementioned configuration, the wheel speed is a wheel speed from which the effect of turning radius has been excluded. Therefore, even when the vehicle turns, the occurrence of error caused by the effect of turning radius in the determination of the wheel for which the reduction of brake pressure by the front-rear wheel distribution control of brake force can be prevented.

According to the abovementioned first, second, fourth or fifth aspect, the difference in slip degree index value between the one wheel of the one system and the one wheel of the other system may be a difference in slip degree index value between the left front and rear wheels, and the difference in slip degree index value between the other wheel of the other system and the other wheel of the one system may be a difference in slip degree index value between the right front and rear wheels.

With the abovementioned configuration, when the difference in slip degree index value between the left front and rear wheels or the difference in slip degree index value between the right front and rear wheels exceeds the threshold for the difference; the failure of one system can be accurately determined and the reduction of brake pressure of the rear wheel of the normal system can be inhibited.

According to the abovementioned first, second, fourth or fifth aspect, the difference in slip degree index value between the one wheel of the one system and the one wheel of the other system may be a difference in slip degree index value between the left and right front wheels, and the difference in slip degree index value between the other wheel of the other system and the other wheel of the one system may be a difference in slip degree index value between the left and right rear wheels.

With the abovementioned configuration, when the difference in slip degree index value between the left and right front wheels or the difference in slip degree index value between the left and right rear wheels exceeds the threshold for the difference, the failure of one system can be accurately determined and the reduction of brake pressure of the rear wheel of the normal system can be inhibited.

The abovementioned brake force control apparatus for a vehicle may additionally include an increasing unit that increases a brake pressure by the front-rear wheel distribution control of brake force with respect to the rear wheel on a side opposite, in a left-right direction, to the rear wheel for which the reduction of brake pressure by the front-rear wheel distribution control of brake force is inhibited.

With the abovementioned configuration, not only the reduction of brake pressure of the rear wheel of the normal system is inhibited, but also the increase in brake pressure of the rear wheel of the failed system is enhanced. Therefore, the increase in excess yaw momentum and decrease in vehicle deceleration can be effectively inhibited.

The abovementioned brake force control apparatus for a vehicle may additionally include an interruption unit that interrupts the front-rear wheel distribution control of brake force when the reduction of brake pressure by the front-rear wheel distribution control of brake force is continuously inhibited for a time equal to or longer than a reference time.

With the abovementioned configuration, when the reduction of brake pressure is continuously inhibited for a time equal to or longer than a reference time, the front-rear wheel distribution control of brake force is interrupted. Therefore, when either of the systems has failed, the imperfect front-rear wheel distribution control of brake force is prevented from being implemented continuously.

In the abovementioned brake force control apparatus for a vehicle, the inhibition unit may prohibit the reduction of brake pressure by the front-rear wheel distribution control of brake force.

With the abovementioned configuration, the reduction of brake pressure is inhibited by prohibiting the reduction of brake pressure. Therefore, the increase in excess yaw momentum and decrease in vehicle deceleration can be inhibited more effectively than in the case in which the reduction amount of brake pressure is decreased.

The abovementioned brake force control apparatus for a vehicle may additionally include a correction unit that corrects the difference in slip degree index value on the basis of a parameter relating to a turning radius of the vehicle.

With the abovementioned configuration, the presence of a failure can be determined more accurately on the basis of the difference in slip degree index value between the left and right front wheels and the difference in slip degree index value between the left and right rear wheels from which an error relating to the vehicle turning radius has been eliminated.

In the abovementioned brake force control apparatus for a vehicle, the threshold for the difference may be set to change according to at least one of a vehicle speed, a vehicle deceleration, and a variation rate of vehicle deceleration.

With the abovementioned configuration, even when the vehicle speed, vehicle deceleration, and variation rate of vehicle deceleration change, the presence of a failure can be determined with the configuration according to the abovementioned first aspect more accurately than in the case in which the threshold for the difference is constant, regardless of the vehicle speed, vehicle deceleration, and variation rate of vehicle deceleration.

In the abovementioned brake force control apparatus for a vehicle, the threshold for the sum index value may be set to change according to at least one of a vehicle speed, a vehicle deceleration, and a variation rate of vehicle deceleration.

With the abovementioned configuration, even when the vehicle speed, vehicle deceleration, and variation rate of vehicle deceleration change, the presence of a failure can be determined with the configuration according to the abovementioned third aspect more accurately than in the case in which the threshold for the sum index value is constant, regardless of the vehicle speed, vehicle deceleration, and variation rate of vehicle deceleration.

The abovementioned brake force control apparatus for a vehicle may additionally include a determination unit that determines that either of the one system and the other system has failed when the reduction of brake pressure by the front-rear wheel distribution control of brake force is inhibited.

With the abovementioned configuration, when the reduction of brake pressure is inhibited, it is determined that either of the one system and the other system has failed. Therefore, where either of the systems fails, the failure can be reliably determined.

The abovementioned brake force control apparatus for a vehicle may additionally include a determination unit that determines that the system including a wheel with a higher wheel speed, from among the two wheels for which the threshold for the difference in slip degree index value is exceeded, has failed when the reduction of brake pressure by the front-rear wheel distribution control of brake force is inhibited.

The abovementioned brake force control apparatus for a vehicle may additionally include a determination unit that determines that the system including a wheel with a higher wheel speed, from among the left and right rear wheels, has failed when the reduction of brake pressure by the front-rear wheel distribution control of brake force is inhibited.

In the abovementioned brake force control apparatus for a vehicle, the inhibition unit may inhibit the reduction of brake pressure by the front-rear wheel distribution control of brake force with respect to a wheel with a lower wheel speed from among the left and right rear wheels when a sign of a difference obtained by subtracting a slip degree index value of the one wheel of the other of the systems from a slip degree index value of the one wheel of the one of the systems is different from a sign of a difference obtained by subtracting a slip degree index value of the other wheel of the one system from a slip degree index value of the other wheel of the other system.

The abovementioned brake force control apparatus for a vehicle may be configured such that the slip degree index value is any of a wheel speed, a slip amount using a vehicle speed as a reference speed, and a slip ratio using a vehicle speed as a reference speed.

The abovementioned brake force control apparatus for a vehicle may be configured such that the difference in slip degree index value between the one wheel of the one system and the one wheel of the other system is the difference in slip degree index value between the left front and rear wheels, the difference in slip degree index value between the other wheel of the other system and the other wheel of the one system is the difference in slip degree index value between the right front and, rear wheels, and when the either difference in slip degree index value exceeds the threshold for the difference, the reduction of brake pressure by the front-rear wheel distribution control of brake force is inhibited with respect to the wheel with a lower wheel speed from among the left and right rear wheels.

The abovementioned brake force control apparatus for a vehicle may be configured such that the sum index value of slip degree index values is either of the sum of slip degree index values and the average value of slip degree index values.

The abovementioned brake force control apparatus for a vehicle may be configured such that a parameter relating to the vehicle turning radius is any of a vehicle yaw rate, a vehicle transverse acceleration, a steering angle of steering wheel and a vehicle speed, an inclination angle in the left-right direction occurring when the vehicle turns, and a difference in ground contact load between the left and right wheels occurring when the vehicle turns.

The abovementioned brake force control apparatus for a vehicle may be configured such that the threshold for the difference is set to change so as to increase with the increase in at least one of vehicle speed, vehicle deceleration, and variation ratio of vehicle deceleration.

The abovementioned brake force control apparatus for a vehicle may be configured such that the threshold for the sum index value is set to change so as to increase with the increase in at least one of vehicle speed, vehicle deceleration, and variation ratio of vehicle deceleration.

The abovementioned brake force control apparatus for a vehicle may be configured such that the failure is a failure in which the brake pressure is lower than a target pressure.

The abovementioned brake force control apparatus for a vehicle may be configured such that the system including the rear wheel with a higher wheel speed is determined to have failed.

The abovementioned brake force control apparatus for a vehicle may be configured such that when an abnormality occurs such that the brake pressure becomes higher than the reference pressure, the control by the abovementioned brake control apparatus for a vehicle is not performed.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Several preferred embodiments of the invention will be described below in greater detail with reference to the appended drawings.

First Embodiment

Figure 1:
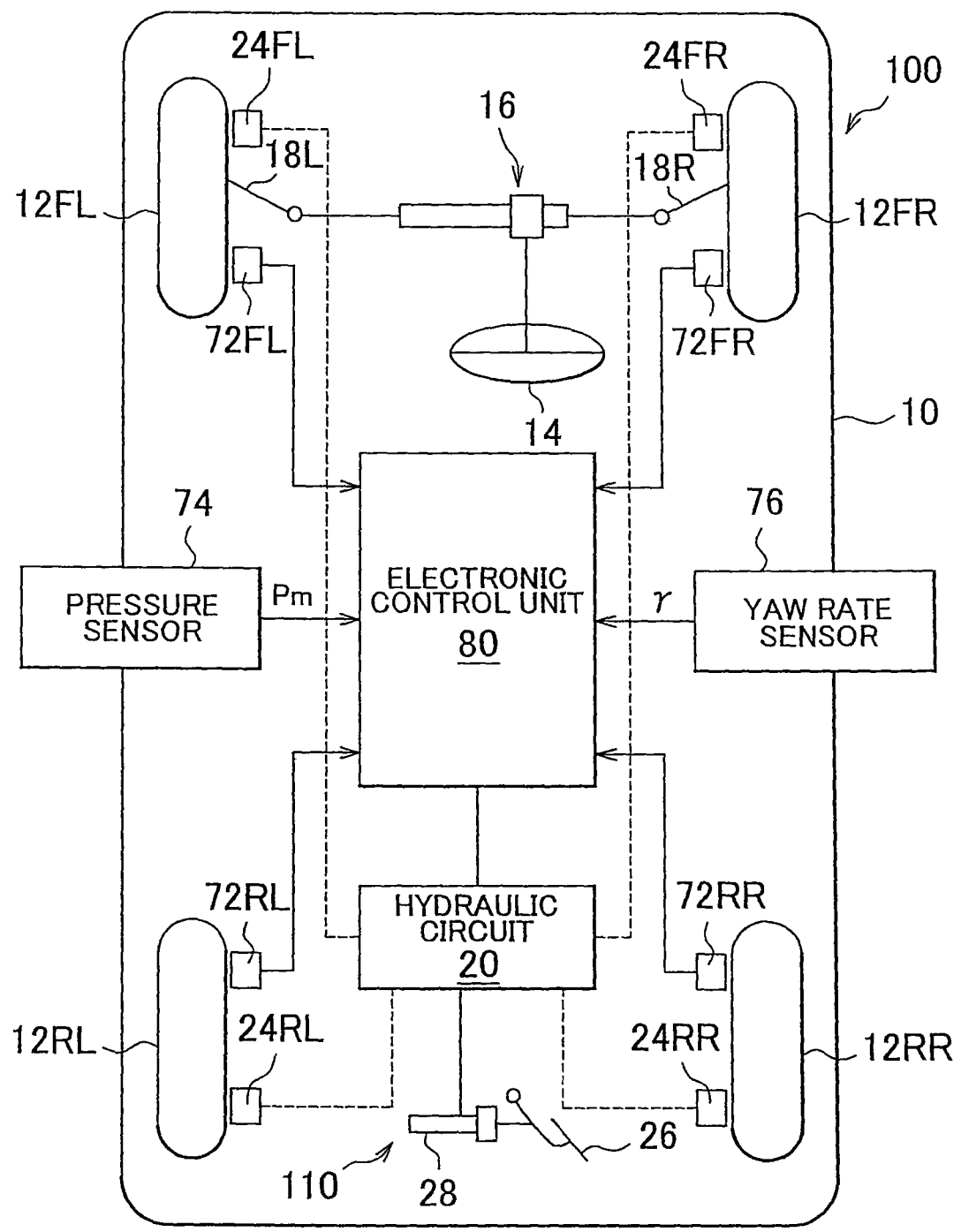
FIG. 1 is a schematic configuration diagram illustrating the first embodiment of the brake force control apparatus for a vehicle in accordance with the invention.
Figure 2:
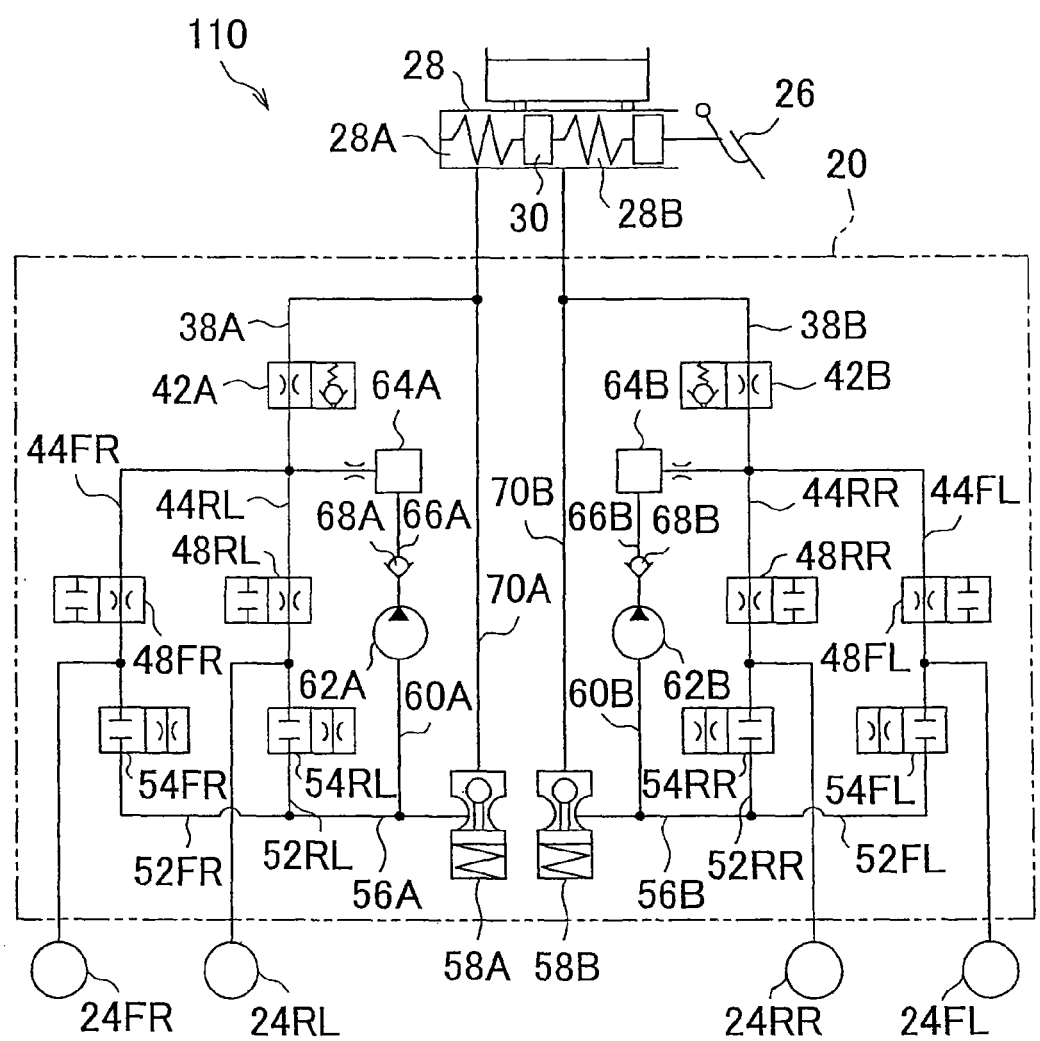
FIG. 2 illustrates the brake device shown in FIG. 1.

FIG. 1 is a schematic configuration diagram illustrating the first embodiment of the brake force control apparatus for a vehicle in accordance with an aspect of the invention. FIG. 2 illustrates the brake device shown in FIG. 1.

In FIG. 1, the reference numeral 100 stands for the entire brake force control apparatus of a vehicle 10. The vehicle 10 has left and right front wheels 12FL and 12FR and left and right rear wheels 12RL and 12RR. The left and right front wheels 12FL and 12FR that are the steered wheels are steered via tie rods 18L and 18R by a power steering device 16 of a rack and pinion type that is driven in response to the operation of a steering wheel 14 performed by the driver.

The brake force of each wheel is controlled by controlling a pressure Pi (i=fr, fl, rr, rl) inside wheel cylinders 24FR, 24FL, 24RR, 24RL, that is, the brake pressure of each wheel, by a hydraulic circuit 20 serving as a brake actuator of the brake device 110. As shown in FIG. 2, the brake device 100 has a master cylinder 28 that pumps brake oil in response to the step-down operation performed by the driver with respect to the brake pedal 26. The master cylinder 28 has a first master cylinder chamber 28A and a second master cylinder chamber 28B that are partitioned by a free piston 30 impelled to a predetermined position by compression coil springs located on both sides thereof.

The first master cylinder chamber 28A and the second master cylinder chamber 28B are connected to one end of a brake hydraulic control conduit 38A of the first system and a brake hydraulic control conduit 38B of the second system, respectively. The brake hydraulic control conduits 38A and 38B connect the master cylinder chambers 28A and 28B to a hydraulic circuit 20.

A communication control valve 42A of the first system is provided in the intermediate section of the brake hydraulic control conduit 38A. In the embodiment shown in the figure, the communication control valve 42A is a linear solenoid valve of a normally open type. The communication control valve 42A is open when a solenoid (not shown in FIG. 2) is not energized by the drive current and closed when the solenoid is energized by the drive current. In particular, when the communication control valve 42A is in the closed state, the differential pressure is maintained such that the pressure on the side opposite that of the master cylinder 28 in the brake hydraulic control conduit 38A corresponding to the communication control valve 42A is higher than the pressure on the master cylinder 28 side, and the differential pressure is increased or decreased according to the voltage of the drive current.

In other words, when the difference in pressure across the communication control valve 42A is equal to or less than an indicated differential pressure determined by the voltage of the drive current relating to the solenoid, the communication control valve 42A maintains the closed state. Therefore, the communication control valve 42A prevents the oil serving as a working fluid from flowing to the master cylinder 28 side through the communication control valve 42A from the side opposite that of the master cylinder 28. As a result, the differential pressure across the communication control valve 42A is prevented from decreasing. By contrast, where the differential pressure across the communication control valve 42A exceeds the indicated differential pressure determined by the voltage of the drive current relating to the solenoid, the communication control valve 42A is open. Therefore, the communication control valve 42A allows the oil to flow to the master cylinder 28 side via the communication control valve 42A from the side opposite that of the master cylinder 28. As a result, the differential pressure across the communication control valve 42A is controlled to the indicated differential pressure.

One end of a brake hydraulic control conduit 44FR for the right front wheel and one end of a brake hydraulic control conduit 44RL for the left rear wheel are connected to the other end of the brake hydraulic control conduit 38A of the first system. Wheel cylinders 24FR and 24RL for controlling the brake force of the right front wheel and left rear wheel, respectively, are connected to the other end of the brake hydraulic control conduit 44FR for the right front wheel and the other end of the brake hydraulic control conduit 44RL for the left rear wheel. Respective electromagnetic opening-closing valves 48FR and 48RL of a normally open type are provided in the intermediate sections of the brake hydraulic control conduit 44FR for the right front wheel and the other end of the brake hydraulic control conduit 44RL for the left rear wheel.

One end of an oil discharge conduit 52FR is connected to the brake hydraulic control conduit 44FR between the electromagnetic opening-closing valve 48FR and the wheel cylinder 24FR, and one end of an oil discharge conduit 52RL is connected to the brake hydraulic control conduit 44RL between the electromagnetic opening-closing valve 48RL and the wheel cylinder 24RL. Respective electromagnetic opening-closing valves 54FR and 54RL of a normally closed type are provided in the intermediate sections of the oil discharge conduits 52FR and 52RL, and the other ends of the oil discharge conduits 52FR and 52RL are connected by a connection conduit 56A to a reservoir 58A of the first system that stores the oil.

As described hereinabove, the electromagnetic opening-closing valves 48FR and 48RL are pressure-increasing valves for increasing or maintaining the pressure inside the wheel cylinders 24FR and 24RL, respectively, and the electromagnetic opening-closing valves 54FR and 54RL are pressure-reducing valves for reducing the pressure inside the wheel cylinders 24FR and 24RL, respectively. Therefore, the electromagnetic opening-closing valves 48FR and 54FR define, by combined operation thereof, the pressure-increasing-reducing valves for increasing, reducing, or maintaining the pressure inside the wheel cylinder 24FR of the right front wheel, and the electromagnetic opening-closing valves 48RL and 54RL define, by combined operation thereof, the pressure-increasing-reducing valves for increasing, reducing, or maintaining the pressure inside the wheel cylinder 24RL of the left rear wheel.

The connection conduit 56A is connected to the intake side of a pump 62A by a connection conduit 60A. The discharge side of the pump 62A is connected to the other end of the brake hydraulic control conduit 38A by a connection conduit 66A having a damper 64A in the intermediate section thereof. A check valve 68A that allows only the flow of oil from the pump 62A to the damper 64A is provided in the connection conduit 66A between the pump 62A and the damper 64A.

Likewise, a communication control valve 42B of the second system is provided in the intermediate section of the brake hydraulic control conduit 38B. In the embodiment shown in the figures, the communication control valve 42B is also a linear solenoid valve of a normally open type and operates similarly to the communication control valve 42A. Therefore, by controlling the voltage of the drive current applied to the solenoid (not shown in FIG. 2), it is possible to restrict the flow of oil from the wheel cylinders 24FL and 24RR to the master cylinder 28 side via the communication control valve 42B, and the differential pressure across the communication control valve 42B is controlled to the indicated differential pressure.

One end of a brake hydraulic control conduit 44FL for the left front wheel and one end of a brake hydraulic control conduit 44RR for the right rear wheel are connected to the other end of the brake hydraulic control conduit 38B of the second system. Wheel cylinders 24FL and 24RR for controlling the brake force of the left front wheel and right rear wheel, respectively, are connected to the other end of the brake hydraulic control conduit 44FL for the left front wheel and the other end of the brake hydraulic control conduit 44RR for the right rear wheel. Respective electromagnetic opening-closing valves 48FL and 48RR of a normally open type are provided in the intermediate sections of the brake hydraulic control conduit 44FL for the left front wheel and the other end of the brake hydraulic control conduit 44RR for the right rear wheel.

One end of an oil discharge conduit 52FL is connected to the brake hydraulic control conduit 44FL between the electromagnetic opening-closing valve 48FL and the wheel cylinder 24FL, and one end of an oil discharge conduit 52RR is connected to the brake hydraulic control conduit 44RR between the electromagnetic opening-closing valve 48RR and the wheel cylinder 24RR. Respective electromagnetic opening-closing valves 54FL and 54RR of a normally closed type are provided in the intermediate sections of the oil discharge conduits 52FL and 52RR, and the other ends of the oil discharge conduits 52FL and 52RR are connected by a connection conduit 56B to a reservoir 58B of the second system that stores the oil.

As described hereinabove, the electromagnetic opening-closing valves 48FL and 48RR are pressure-increasing valves for increasing or maintaining the pressure inside the wheel cylinders 24FL and 24RR, respectively, and the electromagnetic opening-closing valves 54FL and 54RR are pressure-reducing valves for reducing the pressure inside the wheel cylinders 24FL and 24RR, respectively. Therefore, the electromagnetic opening-closing valves 48FL and 54FL define, by combined operation thereof, the pressure-increasing-reducing valves for increasing, reducing, or maintaining the pressure inside the wheel cylinder 24FL of the left front wheel, and the electromagnetic opening-closing valves 48RR and 54RR define, by combined operation thereof, the pressure-increasing-reducing valves for increasing, reducing, or maintaining the pressure inside the wheel cylinder 24RR of the right rear wheel.

The connection conduit 56B is connected to the intake side of a pump 62B by a connection conduit 60B. The discharge side of the pump 62B is connected to the other end of the brake hydraulic control conduit 38B by a connection conduit 66B having a damper 64B in the intermediate section thereof. A check valve 68B that allows only the flow of oil from the pump 62B to the damper 64B is provided in the connection conduit 66B between the pump 62B and the damper 64B. The pumps 62A and 62B are driven by a common electric motor (not shown in FIG. 1).

The reservoirs 58A, 58B are connected by respective connection conduits 70A, 70B to the brake hydraulic control conduits 38A, 38B between the master cylinder 28 and the communication control valves 42A, 42B. Therefore, when the communication control valves 42A, 42B are in a closed state, the reservoirs 58A, 58B allow the flow of oil between the master cylinder chambers 28A, 28B and the reservoirs 58A, 58B. Further, valve bodies of check valves are integrally fixed to the free pistons of the reservoirs 58A, 58B, and the check valves prevent the amount of oil inside the reservoirs 58A, 58B from being equal to or higher than a reference value.

In the embodiment shown in the figure, when the corresponding solenoids are not energized by a drive current, the control valves and opening-closing valves are set to non-control positions shown in FIG. 2. As a result, the pressure inside the first master cylinder chamber 28A is supplied to the wheel cylinders 24FR and 24RL, and a pressure inside the second master cylinder 28B is supplied to the wheel cylinders 24FL and 24RR. Therefore, during normal operation, the pressure inside the wheel cylinders of the wheels that is the brake force increases or decreases according to the step-on force on the brake pedal 26.

By contrast, when the communication control valves 42A, 42B are switched to the closed position and the pumps 62A, 62B are driven in a state in which the opening-closing valves of the wheels are in the positions shown in FIG. 2, the oil in the reservoirs 58A, 58B is lifted by the pumps. Therefore, the pressure that has been pumped up by the pump 62A is supplied to the wheel cylinders 24FR, 24RL, and the pressure pumped up by the pump 62B is supplied to the wheel cylinders 24FL, 24RR. Therefore, the brake pressure of each wheel is increased and reduced by opening and closing of the communication control valves 42A, 42B and opening-closing valves (pressure-increasing-reducing valves) of the wheels, regardless of the step-on force on the brake pedal 26.

In this case, the pressure inside the wheel cylinder is increased (pressure increase mode) when the opening-closing valves 48FR, 48RL (48RR, 48FL) and the opening-closing valves 54FR, 54RL (54RR, 54FL) are in the non-control positions shown in FIG. 2, held (holding mode) when the opening-closing valves 48FR, 48RL (48RR, 48FL) are switched to the closed position and the valves 54FR, 54RL (54RR, 54FL) are in the non-control positions shown in FIG. 2, and reduced (pressure reduction mode) when the opening-closing valves 48FR, 48RL (48RR, 48FL) are switched to the closed position and the valves 54FR, 54RL (54RR, 54FL) are switched to the open positions.

Motors that drive the communication control valves 42A and 42B, opening-closing valves 48FR, 48RL, 48RR, and 48FL, opening-closing valves 54FR, 54RL, 54RR, and 54FL, and pumps 62A, 62B are controlled by the below-described electronic control unit 80. The electronic control unit 80 is constituted by a microcomputer and a drive circuit (this configuration is not shown in FIG. 1). The microcomputer may have a typical configuration that is common in the pertinent technical field that includes a central processing unit (CPU), a random access memory (RAM), and a read only memory (ROM).

The wheels 12FR, 12FL, 12RR, 12RL are provided with wheel speed sensors 72FR, 72FL, 72RR, 72RL that detect the corresponding wheel speed Vwi (i=fr, fl, rr, rl), and the master cylinder 28 is provided with a pressure sensor 74 that detects a master cylinder pressure Pm. The vehicle 10 is also provided with a yaw sensor 76 that detects the yaw rate γ of the vehicle. Signals indicating the values detected by the sensors are inputted to the electronic control unit 80. When the yaw rate sensor 76 detects the yaw rate γ, the left-turn direction of the vehicle is taken as a positive direction.

The electronic control unit 80 controls the brake pressure of the frond left and right wheels on the basis of the master cylinder pressure Pm. As a result, the brake force of the left and right front wheels is controlled according to the step-on operation amount of the brake pedal 26, that is, the amount of brake operation performed by the driver. As will be described hereinbelow in greater detail, the electronic control unit 80 performs control to obtain the advantageous distribution of brake force among the front and rear wheels and also performs failure determination in accordance with the flowcharts shown in FIGS. 3 and 4.

In particular, in the first embodiment, the electronic control unit 80 determines whether or not the first system has failed on the basis of the difference between the wheel speed Vwrl of the left rear wheel and the wheel speed Vwfl of the left front wheel. When the electronic control unit 80 has determined that the first system has failed, the brake pressure of the right rear wheel which is the rear wheel of the normal second system is maintained without being reduced.

Further, the electronic control unit 80 determines whether or not the second system has failed on the basis of the difference between the wheel speed Vwrr of the right rear wheel and the wheel speed Vwfr of the right front wheel. When the electronic control unit 80 determines that the second system has failed, the brake pressure of the left rear wheel which is the rear wheel of the normal first system is maintained without being reduced.

Figure 3:
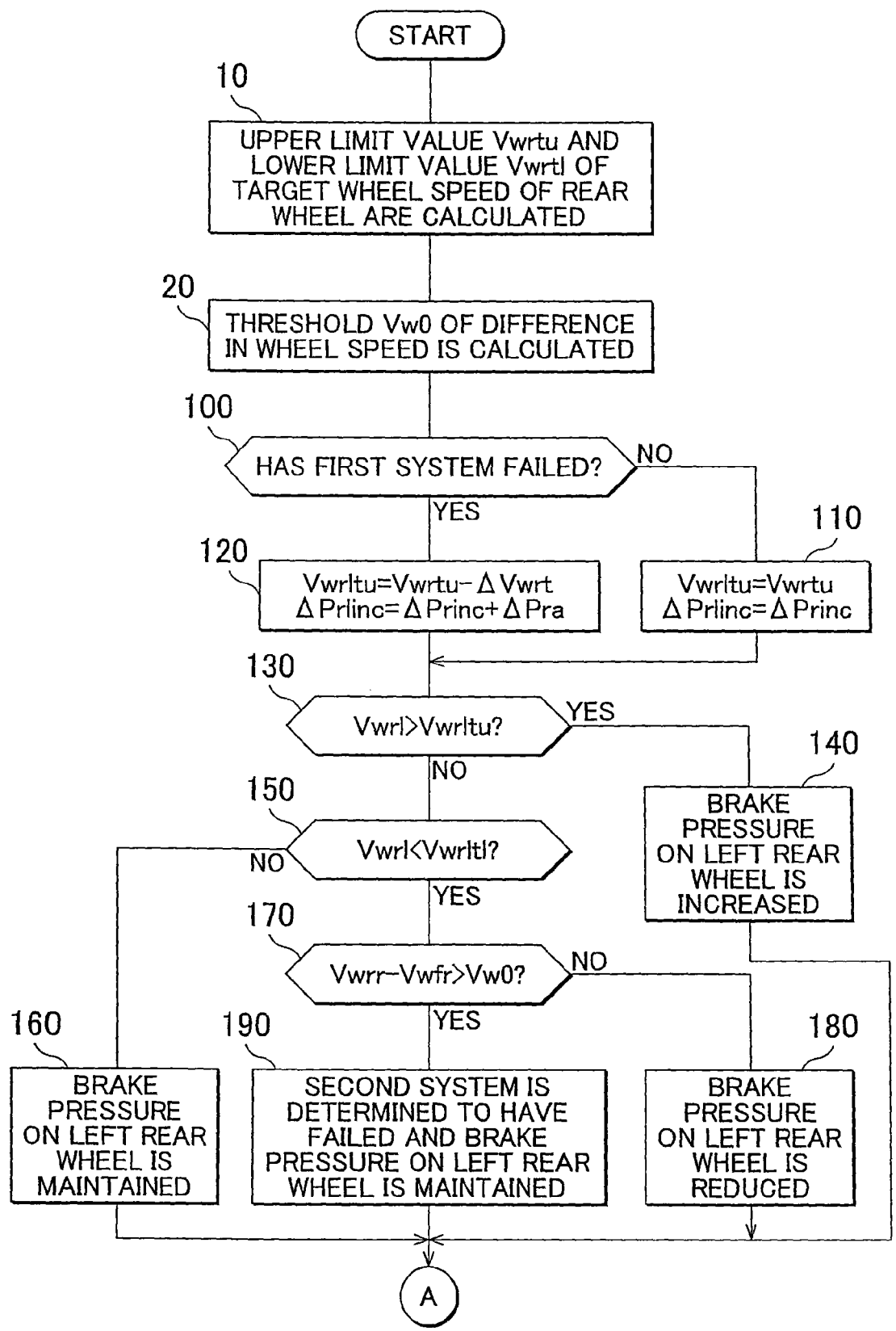
FIG. 3 is a flowchart illustrating the first half of the front-rear wheel distribution control routine for a brake force in the first embodiment.
Figure 4:
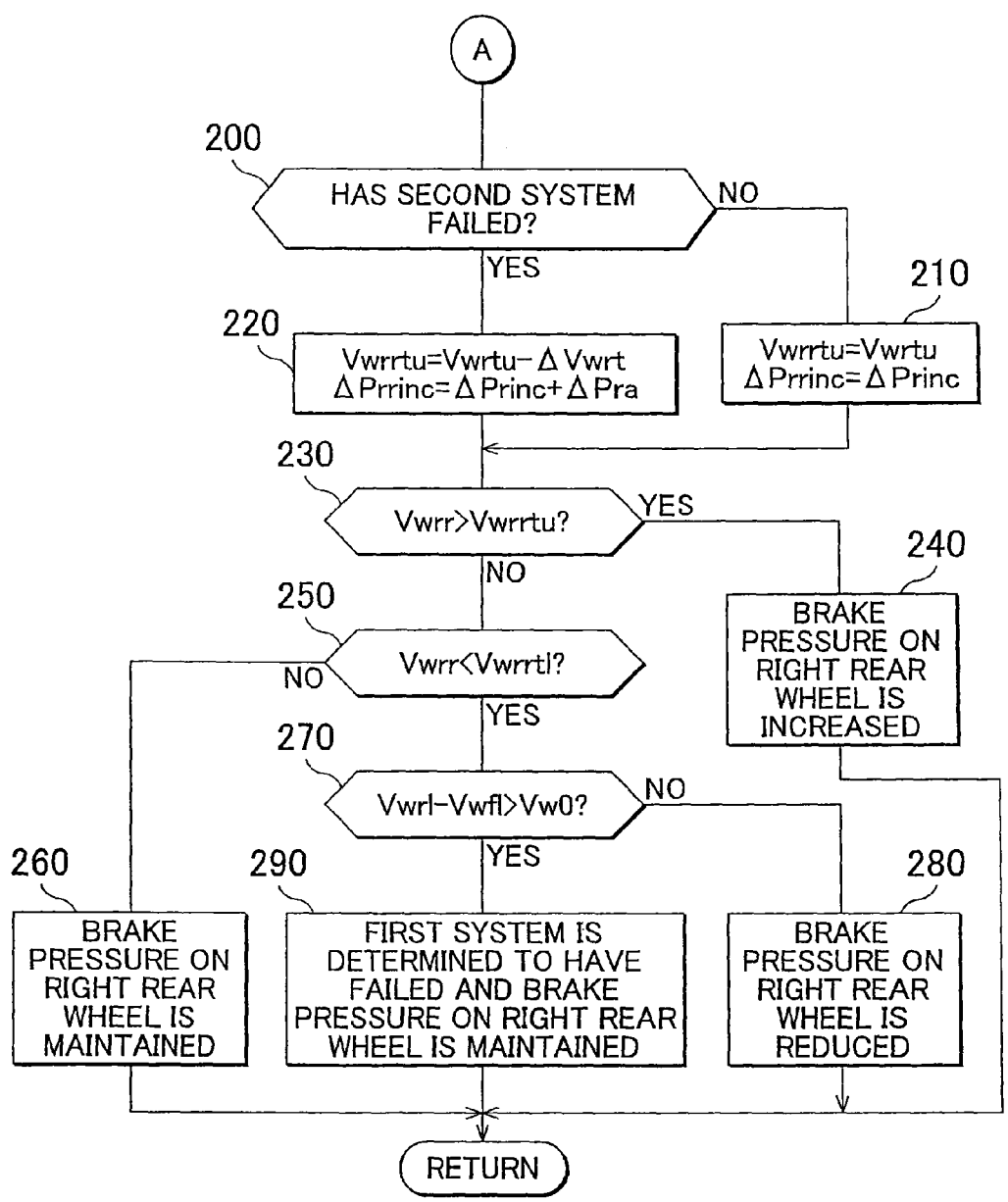
FIG. 4 is a flowchart illustrating the second half of the front-rear wheel distribution control routine for a brake force in the first embodiment.

The control routine of brake force distribution among the front and rear wheels in the first embodiment will be explained below with reference to the flowcharts shown in FIGS. 3 and 4. The control according to the flowcharts shown in FIGS. 3 and 4 is started when the master cylinder pressure Pm becomes equal to or higher than a control start determination reference value Pms (positive constant) and repeatedly executed with a predetermined period till the master cylinder pressure Pm becomes a control end determination reference value Pme (positive constant) or less.

When it becomes necessary to control the brake force of the wheels independently, as in the case of antiskid control or drive control of the vehicle, in the course of executing the front-rear wheel distribution control of brake force, the front-rear wheel distribution control of brake force is interrupted. Further, the front-rear wheel distribution control of brake force is not executed when a failure residing in the brake pressure being excessively high occurs in the first or second system.

First, in step 10, the vehicle speed V is calculated on the basis of the wheel speed Vwi of each wheel, and a differential value of the vehicle speed V is calculated as a deceleration Vd of the vehicle. An upper limit value ΔVwxu and a lower limit value ΔVwxl of a target wheel speed difference between the rear wheels and front wheels are calculated on the basis of the vehicle speed V and vehicle deceleration Vd so that the limit values increase with the increase in vehicle speed V and increase with the increase in vehicle deceleration Vd. The sums of the wheel speed Vwfmax, which is the higher of the left front wheel speed and the right front wheel speed, with the upper limit value ΔVwxu or lower limit value ΔVwxl are calculated as the upper limit value Vwrtu or lower limit value Vwrtl of the target wheel speed of the rear wheels.

In step 20, a threshold Vw0 for the difference between two wheel speeds for determining a failure is calculated on the basis of the vehicle speed V, vehicle deceleration Vd, and vehicle deceleration gradient Vdd, which is a differential value of the deceleration Vd. In this case, the threshold Vw0 for the difference is calculated so as to assume a higher value when the vehicle speed V, vehicle deceleration Vd, and vehicle deceleration gradient Vdd are large.

In step 100, it is determined whether or not the first system has failed and the brake pressure is insufficient, that is, whether or not the first system has been determined to fail in step 390 of the previous cycle. When a positive determination is made, the control advances to step 120, and where the determination is negative, the control advantages to step 110.

In step 110, an upper limit value Vwrltu of the target wheel speed of the left rear wheel which is the rear wheel of the first system is set to the value Vwrtu (positive value) calculated in step 10, and a target pressure increase gradient ΔPrlinc of the left rear wheel is set to a standard value ΔPrinc (positive constant).

In step 120, a correction amount ΔVwrt of the upper limit value Vwrltu of the left rear wheel and the correction amount ΔPra of the target pressure increase gradient ΔPrlinc of the left rear wheel are calculated on the basis of the vehicle speed V, vehicle deceleration Vd, and vehicle deceleration gradient Vdd, which is a differential value of deceleration Vd. In this case, the correction amounts ΔVwrt and ΔPra are calculated so as to assume higher values when the vehicle speed V, vehicle deceleration Vd, and vehicle deceleration gradient Vdd are large.

The upper limit value Vwrltu of the target wheel speed of the left rear wheel and the target pressure increase gradient ΔPrlinc of the left rear wheel are calculated by Eq. 1 and Eq. 2 below. As a result, the upper limit value Vwrltu is corrected by reduction, and the target pressure increase gradient ΔPrlinc is corrected by increase.

$$Vwrltu = Vwrtu - \Delta Vwrt \tag{1}$$

$$\Delta Prlinc = \Delta Princ + \Delta Pra \tag{2}$$

Even if a positive determination is made in step 100, when the upper limit value Vwrltu has already been corrected by reduction and the target pressure increase gradient ΔPrlinc has already been corrected by increase in step 120, the control advances to step 130, without further correcting these upper limit value and target pressure increase gradient.

In step 130, it is determined whether or not the wheel speed Vwrl of the left rear wheel has exceeded the upper limit value Vwrltu of the target wheel speed. Where a negative determination is made, the control advances to step 150, and where a positive determination is made, the control advances to step 140.

In step 140, the brake force of the left rear wheel is increased by increasing the brake pressure Prl of the left rear wheel at the target pressure increase gradient ΔPrlinc calculated in step 110 or 120, and the control then advances to step 200.

In step 150, it is determined whether or not the vehicle speed Vwrl of the left rear wheel is less than a lower limit value Vwrltl (=Vwrtl) of the target wheel speed. Where a positive determination is made, the control advances to step 170, and where a negative determination is made, the control advances to step 160.

In step 160, the brake pressure Pr1 of the left rear wheel is maintained without reduction, and the control then advances to step 200.

In step 170, it is determined whether the difference between the wheel speed Vwrr of the right rear wheel and the wheel speed Vwfr of the right front wheel exceeds a threshold Vw0 of the difference. Where a positive determination is made, the control advances to step 190, and where a negative determination is made, the control advances to step 180.

In step 180, the brake pressure Pr1 of the left rear wheel is reduced at a pressure reduction gradient that has been set in advance, and the control then advances to step 200.

When a positive determination is made in step 130, or a negative determination is made in step 150 or 170 in a state in which the first system is determined to have failed, the determination to the effect that the first system has failed is canceled (this feature is not illustrated by FIG. 3).

In step 190, the second system is determined to have failed, the brake pressure Pr1 of the left rear wheel is maintained, without being reduced, and the control then advances to step 200.

In step 200, it is determined whether or not the second system has failed and the brake pressure is insufficient, that is, whether or not the first system has been determined to fail in step 190. Where a positive determination is made, the control advances to step 220, and where a negative determination is made, the control advances to step 210.

In step 210, an upper limit value Vwrrtu of the target wheel speed of the right rear wheel which is the rear wheel of the second system is set to the value Vwrtu calculated in step 10, and a target pressure increase gradient ΔPrrinc of the right rear wheel is set to the standard value ΔPrinc.

In step 220, the correction amount ΔVwrt of the upper limit value Vwrrtu of the right rear wheel and the correction amount ΔPra of the target pressure increase gradient ΔPrrinc of the right rear wheel are calculated on the basis of the vehicle speed V, vehicle deceleration Vd, and vehicle deceleration gradient Vdd. In this case, the correction amounts ΔVwrt and ΔPra are also calculated so as to assume higher values when the vehicle speed V, vehicle deceleration Vd, and vehicle deceleration gradient Vdd are large.

The upper limit value Vwrrtu of the target wheel speed of the right rear wheel and the target pressure increase gradient ΔPrrinc of the right rear wheel are calculated by Eq. 3 and Eq. 4 below. As a result, the upper limit value Vwrrtu is corrected by reduction, and the target pressure increase gradient ΔPrrinc is corrected by increase.

$$Vwrrtu = Vwrtu - \Delta Vwrt \quad (3)$$

$$\Delta Prrinc = \Delta Princ + \Delta Pra \quad (4)$$

Even if a positive determination is made in step 200, when the upper limit value Vwrrtu has already been corrected by reduction and the target pressure increase gradient ΔPrrinc has already been corrected by increase in step 220, the control advances to step 230, without further correcting these upper limit value and target pressure increase gradient.

In step 230, it is determined whether or not the wheel speed Vwrr of the right rear wheel has exceeded the upper limit value Vwrrtu of the target wheel speed. Where a negative determination is made, the control advances to step 250, and where a positive determination is made, the control advances to step 240.

In step 240, the brake force of the right rear wheel is increased by increasing the brake pressure Prr of the right rear wheel at the target pressure increase gradient ΔPrrinc calculated in step 210 or 220, and the control then returns to step 10.

In step 250, it is determined whether or not the vehicle speed Vwrr of the right rear wheel is less than a lower limit value Vwrrt1 (=Vwrt1) of the target wheel speed. Where a positive determination is made, the control advances to step 270, and where a negative determination is made, the control advances to step 260.

In step 260, the brake pressure Prr of the right rear wheel is maintained without reduction, and the control then returns to step 10.

In step 270, it is determined whether the difference between the wheel speed Vwrl of the left rear wheel and the wheel speed Vwfl of the left front wheel exceeds the threshold Vw0 for the difference. Where a positive determination is made, the control advances to step 290, and where a negative determination is made, the control advances to step 280.

In step 280, the brake pressure Prr of the right rear wheel is reduced at a pressure reduction gradient that has been set in advance, and the control then returns to step 10.

When a positive determination is made in step 230, or a negative determination is made in step 250 or 270 in a state in which the second system is determined to have failed, the determination to the effect that the second system has failed is canceled (this feature is not illustrated by FIG. 4).

In step 290, the first system is determined to have failed, the brake pressure Prr of the right rear wheel is maintained, without being reduced, and the control then returns to step 10.

In the first embodiment, the brake control is started by the driver, and the control according to the flowchart shown in FIGS. 3 and 4 is started when the master cylinder pressure Pm becomes equal to or higher than the control start determination reference value Pms.

First, in step 10, the upper limit value ΔVwxu and the lower limit value ΔVwxl of a target wheel speed difference between the rear wheels and the front wheels are calculated. The sums of the wheel speed Vwfmax, which is the higher of the left front wheel speed and the right front wheel speed, with the upper limit value ΔVwxu or lower limit value ΔVwxl are calculated as the upper limit value Vwrtu or lower limit value Vwrt1 of the target wheel speed of the rear wheels.

In step 20, the threshold Vw0 for the difference between two wheel speeds for determining a failure is calculated so as to assume a higher value when the vehicle speed V, vehicle deceleration Vd, and vehicle deceleration gradient Vdd are large.

In steps 130 to 190, the brake pressure Pr1 of the left rear wheel is controlled so that the wheel speed Vwrl of the left rear wheel, which is the rear wheel of the first system, assumes a value that is equal to or less than the upper limit value Vwrltu of the target wheel speed and equal to or greater than the lower limit value Vwrlt1 (=Vwrt1) of the target wheel speed.

Likewise, in steps 230 to 290, the brake pressure Prr of the right rear wheel is controlled so that the wheel speed Vwrr of the right rear wheel, which is the rear wheel of the second system, assumes a value that is equal to or less than the upper limit value Vwrrtu of the target wheel speed and equal to or greater than the lower limit value Vwrrt1 (=Vwrt1) of the target wheel speed.

By the above-described control of the brake pressure of the left and right rear wheels, the brake force of the left and right rear wheels is controlled so that the relationship of the wheel speeds Vwrl and Vwrr of the left and right rear wheels with the wheel speed Vwfmax, which is the higher of the left and right front wheel speeds, is within a predetermined range. The distribution of the brake force among the front and rear wheels is thereby controlled to the preferred distribution.

Further, in the first embodiment, whether or not the first system has failed is determined by determining in step 270 whether or not the difference between the wheel speed Vwrl of the left rear wheel and the wheel speed Vwfl of the left front wheel exceeds the threshold Vw0 for the difference. Whether or not the second system has failed is determined by determining in step 170 whether or not the difference between the wheel speed Vwrr of the right rear wheel and the wheel speed Vwfr of the right front wheel exceeds the threshold Vw0 for the difference.

In particular, when it is determined that the difference Vwrr−Vwfr in wheel speed between the right front wheel and the right rear wheel exceeds the threshold Vw0 for the difference in a state in which the wheel speed Vwrl of the left rear wheel is less than the lower limit value Vwrlt1, it is determined that the second system has failed (steps 150, 170, 190). Likewise, when it is determined that the difference Vwrl−Vwfl in wheel speed between the left front wheel and the left rear wheel exceeds the threshold Vw0 for the difference in a state in which the wheel speed Vwrr of the right rear wheel is less than the lower limit value Vwrrt1, it is determined that the first system has failed (steps 250, 270, 290).

Where both the first system and the second system are normal, both the difference in wheel speed between the left front and rear wheels and the difference in wheel speed between the right front and rear wheels do not exceed the threshold Vw0. Therefore, even if a positive determination is made in steps 150 and 250, a negative determination is made in steps 170 and 270. Therefore, when a positive determination is made in steps 150 and 250, the wheel speed of the left and right rear wheels is controlled to a value equal to or greater than the lower limit value by reducing the brake pressure of the left and right rear wheels.

Figure 13:
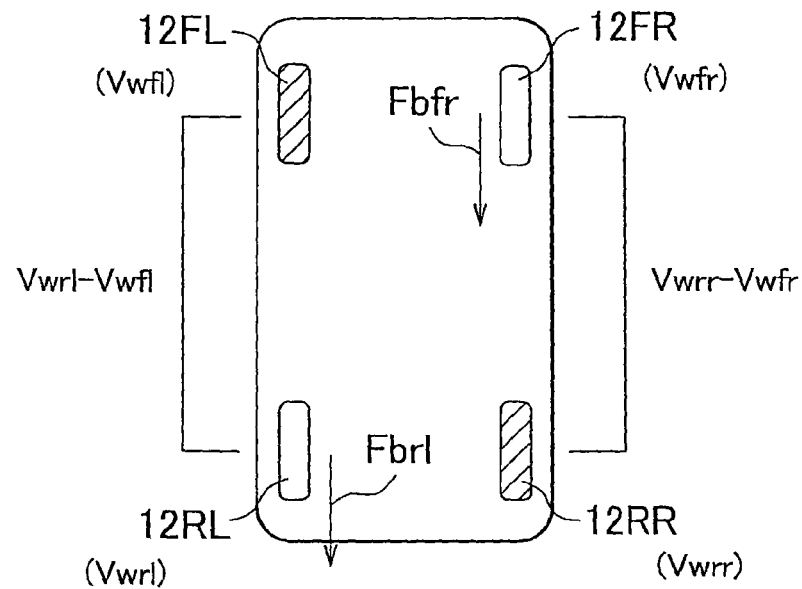
FIG. 13 illustrates the essentials of failure determination in the first embodiment.

By contrast, when the first system is normal and the second system fails, the required brake forces Fbfr and Fbrl are generated in the right front wheel and left rear wheel as shown in FIG. 13, but no required brake force is generated in the left front wheel and right rear wheel. Therefore, when the amount of brake operation performed by the driver is large, a state is assumed in which the wheel speed Vwrl of the left rear wheel is less than the lower limit value Vwrlt1 and the difference Vwrr−Vwfr in wheel speed between the right front wheel and the right rear wheel exceeds the threshold Vw0 for the difference.

Therefore, a positive determination is made in steps 150 and 170 and the second system is determined in step 190 to have failed. The brake pressure Prl of the left rear wheel is maintained without being reduced. Therefore, the reduction of the brake force of the left rear wheel is prevented.

Further, where the second system is normal, but the first system fails, the required brake force is generated in the left front wheel and the right rear wheel, but no required brake force is generated in the right front wheel and the left rear wheel. Therefore, when the amount of brake operation performed by the driver is large, a state is assumed in which the wheel speed Vwrr of the right rear wheel is less than the lower limit value Vwrrt1 and the difference Vwrl−Vwfl in wheel speed between the left front wheel and the left rear wheel exceeds the threshold Vw0 for the difference.

Therefore, a positive determination is made in steps 250 and 270 and the first system is determined in step 290 to have failed. The brake pressure Prr of the right rear wheel is maintained without being reduced. Therefore, the reduction of the brake force of the right rear wheel is prevented.

Second Embodiment

Figure 5:
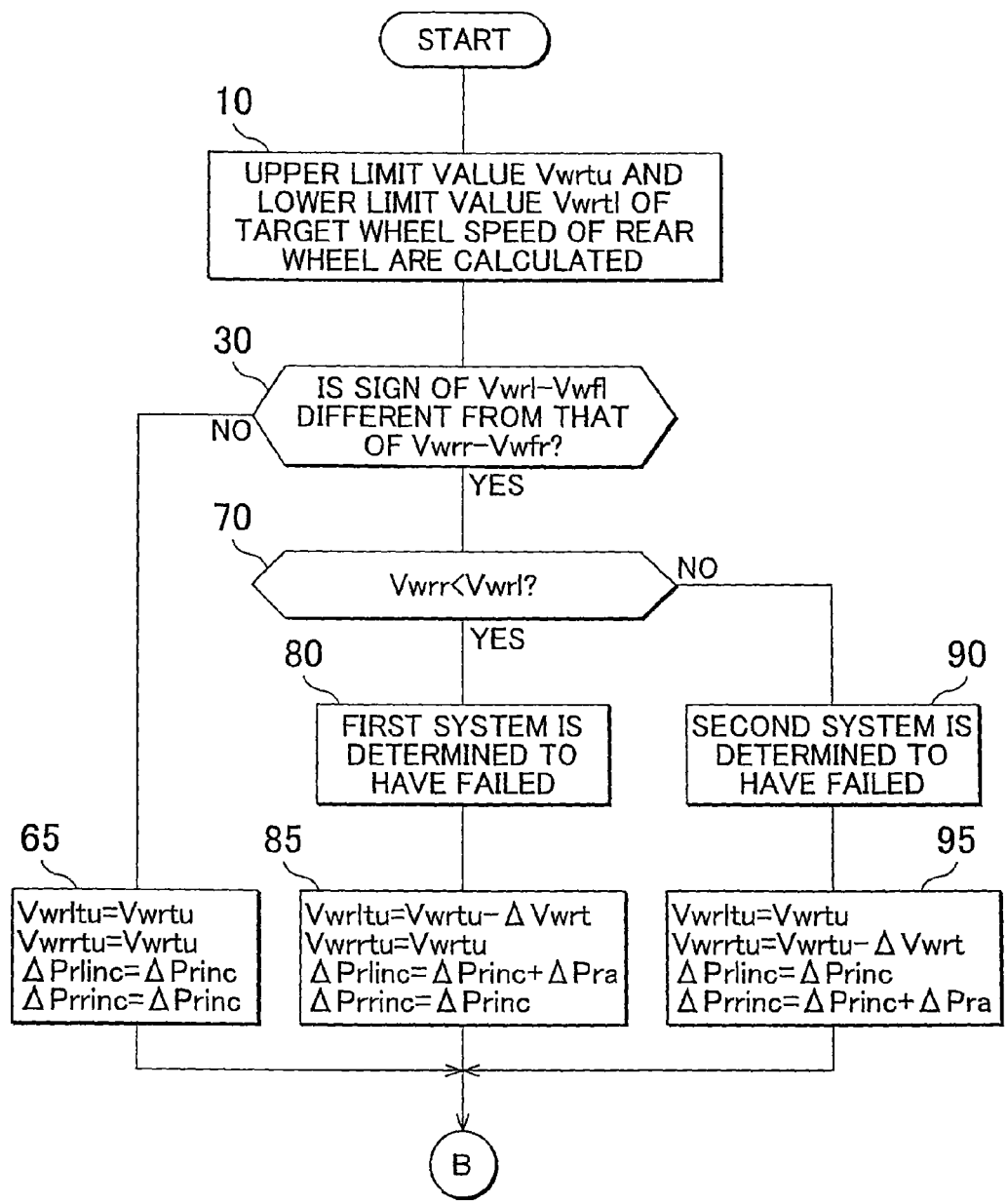
FIG. 5 is a flowchart illustrating the first half of the front-rear wheel distribution control routine for a brake force in the second embodiment of the brake force control apparatus for a vehicle in accordance with the invention.
Figure 6:
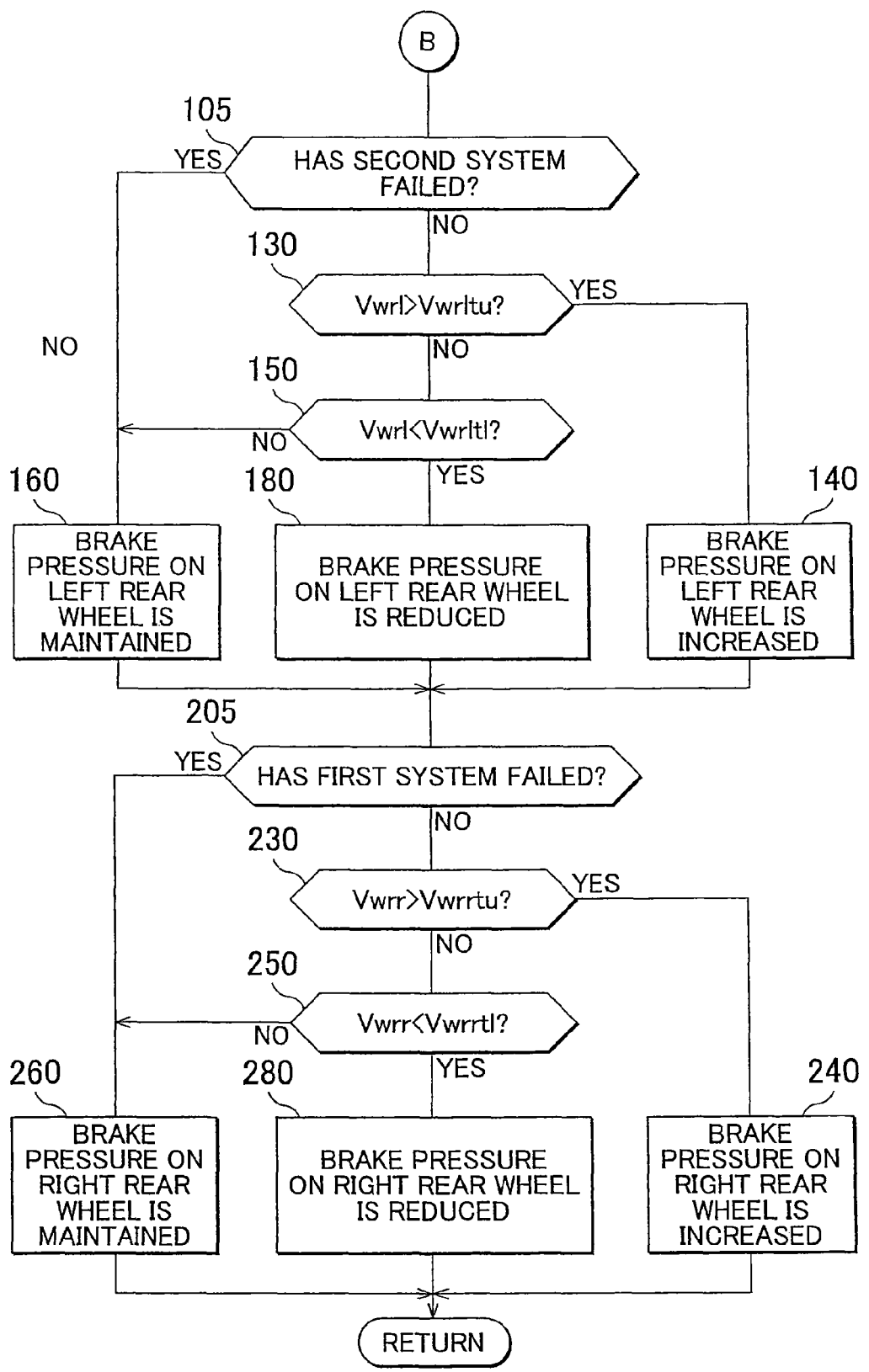
FIG. 6 is a flowchart illustrating the second half of the front-rear wheel distribution control routine for a brake force in the second embodiment.

FIGS. 5 and 6 are flowcharts illustrating the front-rear wheel distribution control routine for a brake force in the second embodiment of the brake force control apparatus for a vehicle in accordance with the invention. In FIGS. 5 and 6, the steps identical to those shown in FIGS. 3 and 4 are assigned with step numbers identical to the step numbers assigned in FIGS. 3 and 4. The same relates to other below-described embodiments.

In the second embodiment, where step 10 is completed, step 30 is implemented instead of step 20.

In step 30, it is determined whether the sign of the difference Vwrl−Vwfl in wheel speed between the left front and rear wheels is different from the sign of the difference Vwrr−Vwfr in wheel speed between the right front and rear wheels, that is, whether or not the first or second system has failed. Where a positive determination is made, the control advances to step 70, and where a negative determination is made, the control advances to step 65.

In step 65, the upper limit values Vwrltu and Vwrrtu of the target wheel speed of the left and right rear wheels is set to the value Vwrtu calculated in step 10 and the target pressure increase gradients ΔPrlinc and ΔPrrinc of the left and right rear wheels are set to the standard value ΔPrinc.

In step 70, it is determined whether or not the wheel speed Vwrr of the right rear wheel is lower than the wheel speed Vwrl of the left rear wheel. When a positive determination is made, it is determined in step 80 that the first system has failed and the control then advances to step 85. By contrast, where a negative determination is made, it is determined in step 90 that the second system has failed and the control then advances to step 95.

In step 85, the upper limit value Vwrltu of the target wheel speed of the left rear wheel and the target pressure increase gradient ΔPrlinc of the left rear wheel are calculated by Eq. 1 and Eq. 2 described above. Further, the upper limit value Vwrrtu of the target wheel speed of the right rear wheel is set to the value Vwrtu calculated in step 10 and the target pressure increase gradient ΔPrrinc of the right rear wheel is set to the standard value ΔPrinc.

Even if a positive determination is made in step 70, when the upper limit value Vwrltu has already been corrected by reduction and the target pressure increase gradient ΔPrlinc has already been corrected by increase in step 85, the control advances to step 105, without further correcting these upper limit value and target pressure increase gradient.

In step 95, the upper limit values Vwrltu of the target wheel speed of the left rear wheel is set to the value Vwrtu calculated in step 10 and the target pressure increase gradient ΔPrlinc of the left rear wheel is set to the standard value ΔPrinc. The upper limit value Vwrrtu of the target wheel speed of the right rear wheel and the target pressure increase gradient ΔPrrinc of the right rear wheel are calculated by Eq. 3 and Eq. 4 described above.

Even if a negative determination is made in step 70, when the upper limit value Vwrltu has already been corrected by reduction and the target pressure increase gradient ΔPrlinc has already been corrected by increase in step 95, the control advances to step 105, without further correcting these upper limit value and target pressure increase gradient.

Where step 65, 85, or 95 is completed, the control advances to step 105 and it is determined whether or not the second system has failed. Where a positive determination is made, the control advances to step 160, and where a negative determination is made, the control advances to step 130.

Steps 130 and 150 are implemented in the same manner as in the first embodiment. However, in the second embodiment, where a positive determination is made in step 150, the control advances to step 180, without implementing step 170.

Further, in the second embodiment, where step 140, 160, or 180 is completed, the control advances to step 205 and it is determined whether or not the first system has failed. When a positive determination is made, the control advances to step 260, and when a negative determination is made, the control advances to step 230.

Steps 230 and 250 are implemented in the same manner as in the first embodiment. However, in the second embodiment, where a positive determination is made in step 250, the control advances to step 280, without implementing step 270. Other steps of the second embodiment are implemented in the same manner as in the above-described first embodiment.

According to the second embodiment, when both the first system and the second system are normal, the sign of the difference Vwrl−Vwfl in wheel speed between the left front and rear wheels is the same as the sign of the difference Vwrr−Vwfr in wheel speed between the right front and rear wheels. Therefore, a negative determination is made in step 30. A negative determination is similarly made in steps 105 and 205. Therefore, similarly to the first embodiment, the brake force of the left and right rear wheels is controlled so that the relationship of the wheel speeds Vwrl and Vwrr of the left and right rear wheels with the wheel speed Vwfmax, which is the higher of the left and right front wheel speeds, is within a predetermined range. The distribution of the brake force among the front and rear wheels is thereby controlled to the preferred distribution.

Further, in the second embodiment, where the first or second system fails, the sign of the difference Vwrl−Vwfl in wheel speed between the left front and rear wheels becomes different from the sign of the difference Vwrr−Vwfr in wheel speed between the right front and rear wheels. Therefore, a positive determination is made in step 30. It is then determined in step 70 whether or, not the wheel speed Vwrr of the right rear wheel is lower than the wheel speed Vwrl of the left rear wheel.

Figure 14:
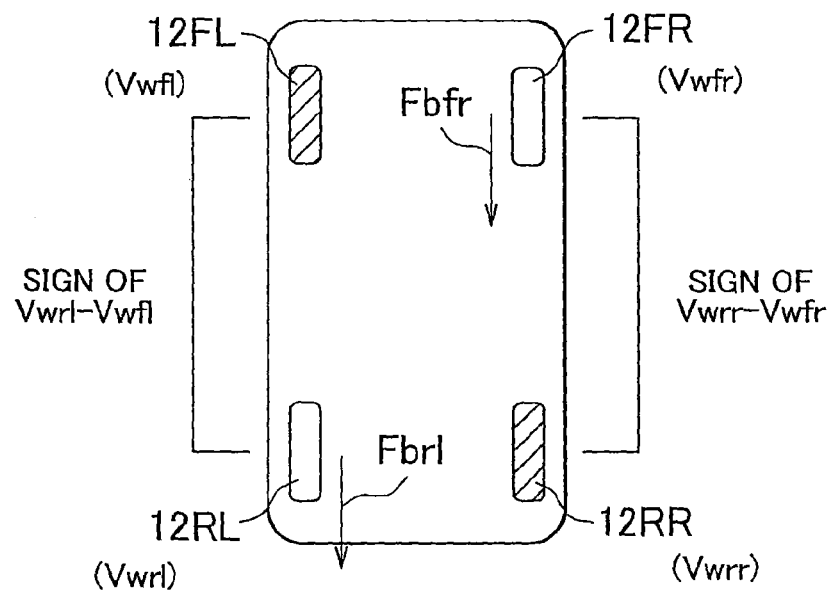
FIG. 14 illustrates the essentials of failure determination in the second embodiment.

For example, where the first system is normal and the second system fails, the required brake forces Fbfr and Fbrl are generated in the right front wheel and left rear wheel as shown in FIG. 14, but no required brake force is generated in the left front wheel and right rear wheel. Therefore, when the amount of brake operation performed by the driver is large, the wheel speed Vwrl of the left rear wheel becomes lower than the wheel speed Vwrr of the right rear wheel.

Therefore, a negative determination is made in step 70 and the second system is thus determined in step 90 to have failed. Therefore, a positive determination is made in step 105, the brake pressure Prl of the left rear wheel is maintained in step 160, without being reduced, and the brake force of the left rear wheel is thereby prevented from being reduced.

By contrast, where the second system is normal, but the first system fails, the required brake force is generated in the left front wheel and right rear wheel, but no required brake force is generated in the right front wheel and left rear wheel. Therefore, when the amount of brake operation performed by the driver is large, the wheel speed Vwrl of the left rear wheel is higher than the wheel speed Vwrr of the right rear wheel.

Accordingly, a positive determination is made in step 70 and the first system is determined in step 80 to have failed. Therefore, a positive determination is made in step 205, and the brake pressure Prr of the right rear wheel is maintained in step 260, without being reduced. Therefore, the reduction of the brake force of the right rear wheel is prevented.

Third Embodiment

Figure 7:
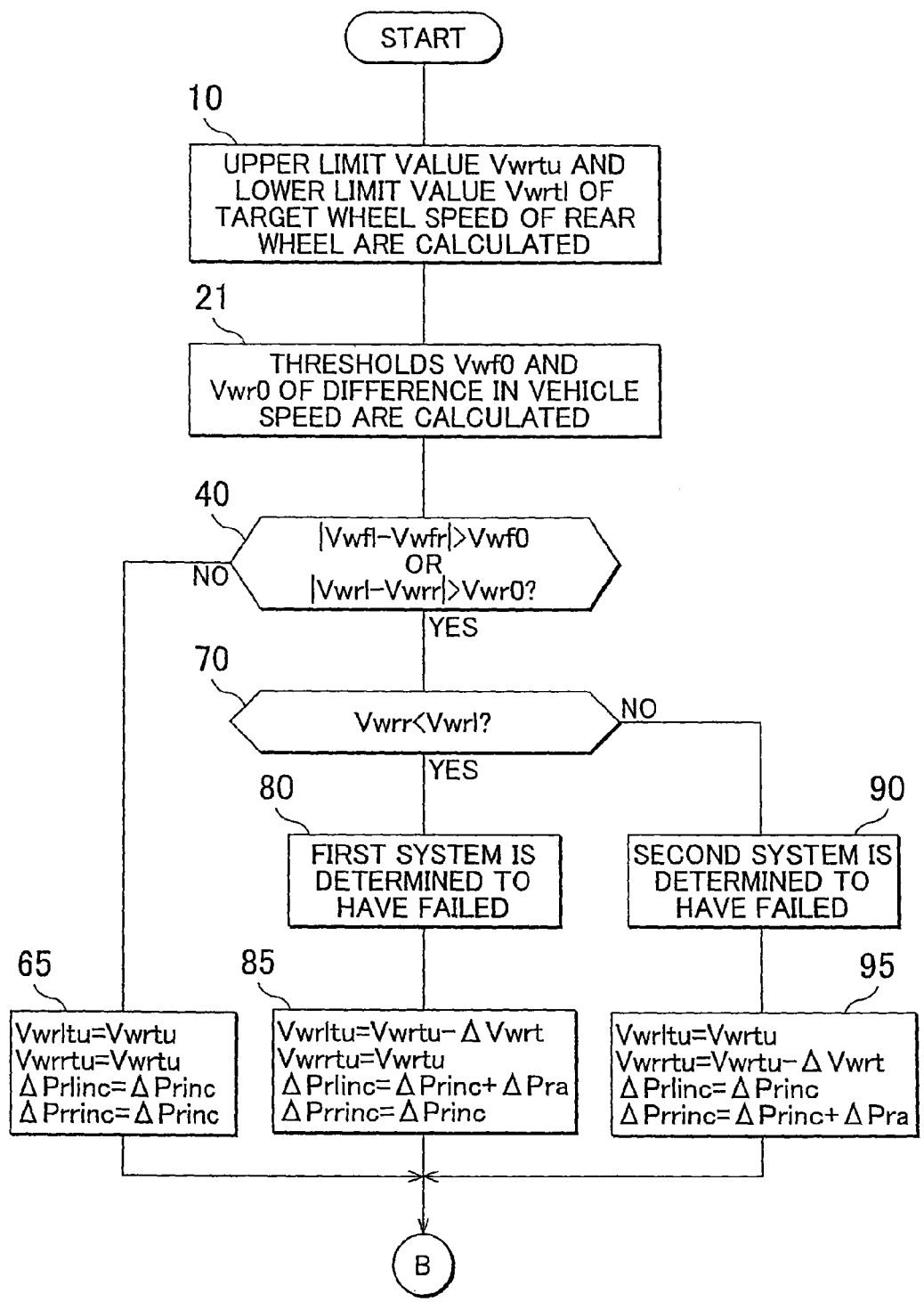
FIG. 7 is a flowchart illustrating the first half of the front-rear wheel distribution control routine for a brake force in the third embodiment of the brake force control apparatus for a vehicle in accordance with the invention.

FIG. 7 is a flowchart illustrating the first half of the front-rear wheel distribution control routine for a brake force in the third embodiment of the brake force control apparatus for a vehicle in accordance with the invention.

In the third embodiment, once step 10 is completed, step 21 is implemented, and once step 21 is completed, the control advances to step 40.

In step 21, a threshold Vwf0 for the difference in wheel speed between the left and right front wheels and a threshold Vwr0 for the difference in wheel speed between the left and right rear wheels that serve for failure determination are calculated on the basis of vehicle speed V, vehicle deceleration Vd, and vehicle deceleration gradient Vdd. In this case, the thresholds Vwf0 and Vwr0 for the difference are calculated so as to assume higher values when the vehicle speed V, vehicle deceleration Vd, and vehicle deceleration gradient Vdd are large.

In step 40, it is determined whether or not the absolute value of the difference Vwfl−Vwfr in wheel speed between the left and right front wheels exceeds the threshold Vwf0 or whether or not the absolute value of the difference Vwrl−Vwrr in wheel speed between the left and right rear wheels exceeds the threshold Vwr0, that is, whether or not the first or second system has failed. When a negative determination is made, the control advances to step 65, and when a positive determination is made, the control advances to step 70. Other steps of the third embodiment, that is, steps 70 to 280, are implemented similarly to the steps of the above-described second embodiment.

With the third embodiment, when both the first system and the second system are normal, the absolute value of the difference Vwfl−Vwfr in wheel speed between the left and right front wheels and the absolute value of the difference Vwrl−Vwrr in wheel speed between the left and right rear wheels are equal to or less than the threshold Vwr0. Therefore, a negative determination is made in step 40, that is, it is determined that both the first system and the second system are normal.

Further, in the third embodiment, where either of the first system and second system fails, the absolute value of the difference Vwfl−Vwfr in wheel speed between the left and right front wheels or the absolute value of the difference Vwrl−Vwrr in wheel speed between the left and right rear wheels exceeds the threshold Vwf0 or the threshold Vwr0. Therefore, a positive determination is made in step 40, and it is determined in step 70 whether or not the wheel speed Vwrr of the right rear wheel is less than the wheel speed Vwrl of the left rear wheel.

Figure 15:
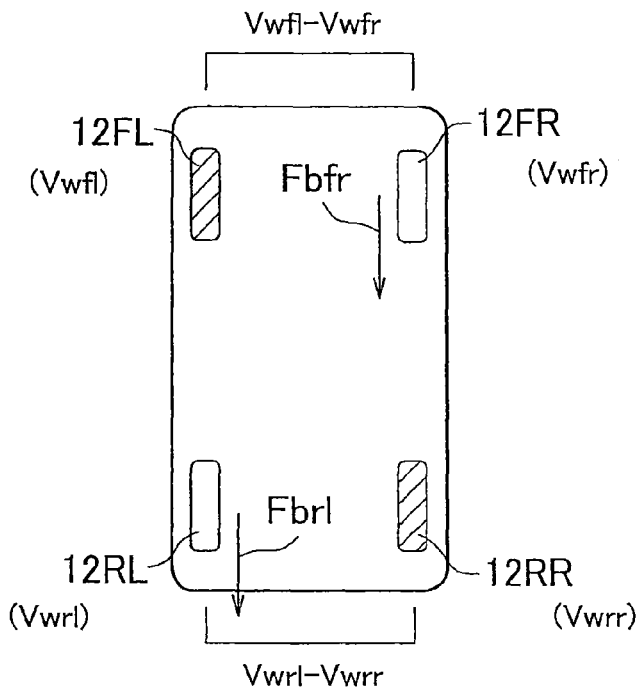
FIG. 15 illustrates the essentials of failure determination in the third embodiment.

For example, when the first system is normal and the second system fails, the required brake forces Fbfr and Fbrl are generated in the right front wheel and left rear wheel as shown in FIG. 15, but no required brake force is generated in the left front wheel and right rear wheel. As a result, when the amount of brake operation performed by the driver is large, the wheel speed Vwrl of the left rear wheel becomes lower than the wheel speed Vwrr of the right rear wheel. Therefore, a negative determination is made in step 70, and the second system is thus determined in step 90 to have failed.

By contrast, where the second system is normal, but the first system fails, the required brake force is generated in the left front wheel and the right rear wheel, but no, required brake force is generated in the right front wheel and the left rear wheel. As a result, when the amount of brake operation performed by the driver is large, the wheel speed Vwrl of the left rear wheel is higher than the wheel speed Vwrr of the right rear wheel. Therefore, a positive determination is made in step 70, and the first system is thus determined in step 80 to have failed.

Similarly to the first and second embodiments, when both the first system and the second system are normal, the brake force of the left and right rear wheels is controlled so that the relationship of the wheel speeds Vwrl and Vwrr of the left and right rear wheels with the wheel speed Vwfmax, which is the higher of the left and right front wheel speeds, is within a predetermined range. Therefore, the distribution of the brake force among the front and rear wheels is thereby controlled to the preferred distribution. Further, when the second system has failed, the brake pressure Prl of the left rear wheel is maintained without being changed, and the brake force of the left rear wheel is thereby prevented from being reduced. When the first system has failed, the brake pressure Prr of the right rear wheel is maintained without being reduced, and the brake force of the right rear wheel is thereby prevented from being reduced. The same results are obtained in the below-described other embodiments.

Fourth Embodiments

Figure 8:
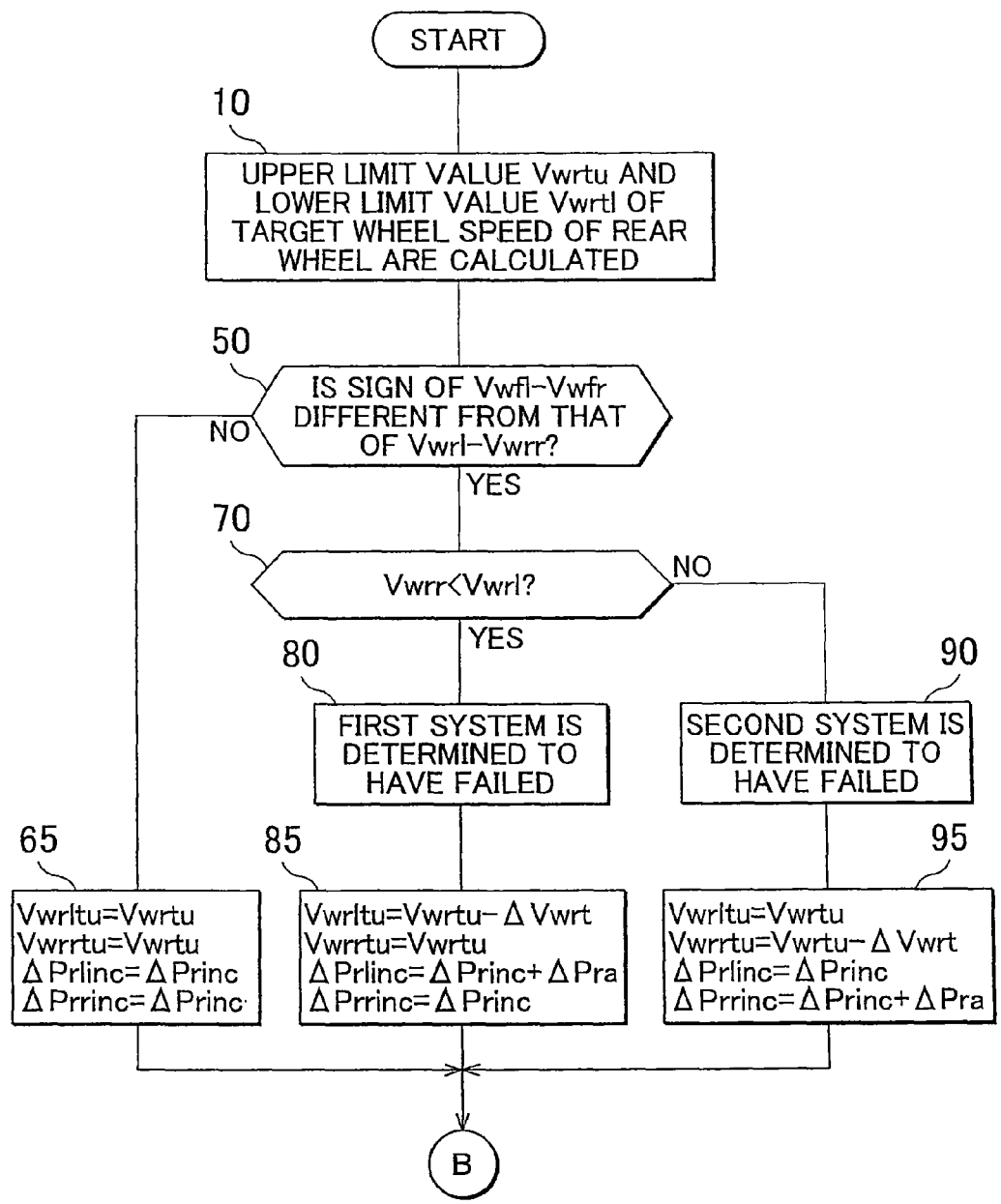
FIG. 8 is a flowchart illustrating the first half of the front-rear wheel distribution control routine for a brake force in the fourth embodiment of the brake force control apparatus for a vehicle in accordance with the invention.

FIG. 8 is a flowchart illustrating the first half of the front-rear wheel distribution control routine for a brake force in the fourth embodiment of the brake force control apparatus for a vehicle in accordance with the invention.

In the fourth embodiment, once step 10 is completed, step 50 is implemented instead of step 20.

In step 50, it is determined whether or not the sign of the difference Vwfl−Vwfr in wheel speed between the left and right front wheels is different from the sign of the difference Vwrl−Vwrr in wheel speed between the left and right rear wheels, that is, whether or not the first or second system has failed. Where a negative determination is made, the control advances to step 65, and where a positive determination is made, the control advances to step 70. Other steps of the fourth embodiment are implemented in the same manner as in the above-described second embodiment.

According to the fourth embodiment, when both the first system and the second system are normal, the sign of the difference Vwfl−Vwfr in wheel speed between the left and right front wheels is the same as the sign of the difference Vwrl−Vwrr in wheel speed between the left and right rear wheels. Therefore, a negative determination is made in step 50, that is, it is determined that the first and second systems are both normal.

Further, in the fourth embodiment, where either of the first system and second system fails, the sign of the difference Vwfl−Vwfr in wheel speed between the left and right front wheels becomes different from the sign of the difference Vwrl−Vwrr in wheel speed between the left and right rear wheels. Therefore, a positive determination is made in step 50. Further, it is determined in step 70 whether or not the wheel speed Vwrr of the right rear wheel is lower than the wheel speed Vwrl of the left rear wheel.

Figure 16:
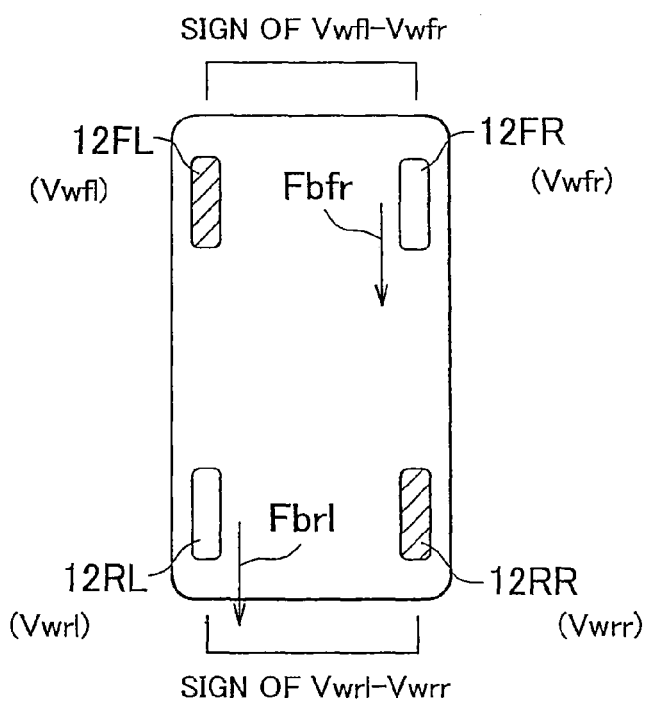
FIG. 16 illustrates the essentials of failure determination in the fourth embodiment.

For example, where the first system is normal and the second system fails, the required brake forces Fbfr and Fbrl are generated in the right front wheel and left rear wheel as shown in FIG. 16, but no required brake force is generated in the left front wheel and right rear wheel. As a result, when the amount of brake operation performed by the driver is large, the wheel speed Vwrl of the left rear wheel becomes lower than the wheel speed Vwrr of the right rear wheel. Therefore, a negative determination is made in step 70, and the second system is thus determined in step 90 to have failed.

By contrast, where the second system is normal, but the first system fails, the required brake force is generated in the left front wheel and right rear wheel, but no required brake force is generated in the right front wheel and left rear wheel. As a result, when the amount of brake operation performed by the driver is large, the wheel speed Vwrl of the left rear wheel is higher than the wheel speed Vwrr of the right rear wheel. Therefore, a positive determination is made in step 70, and the first system is thus determined in step 80 to have failed.

Fifth Embodiment

Figure 9:
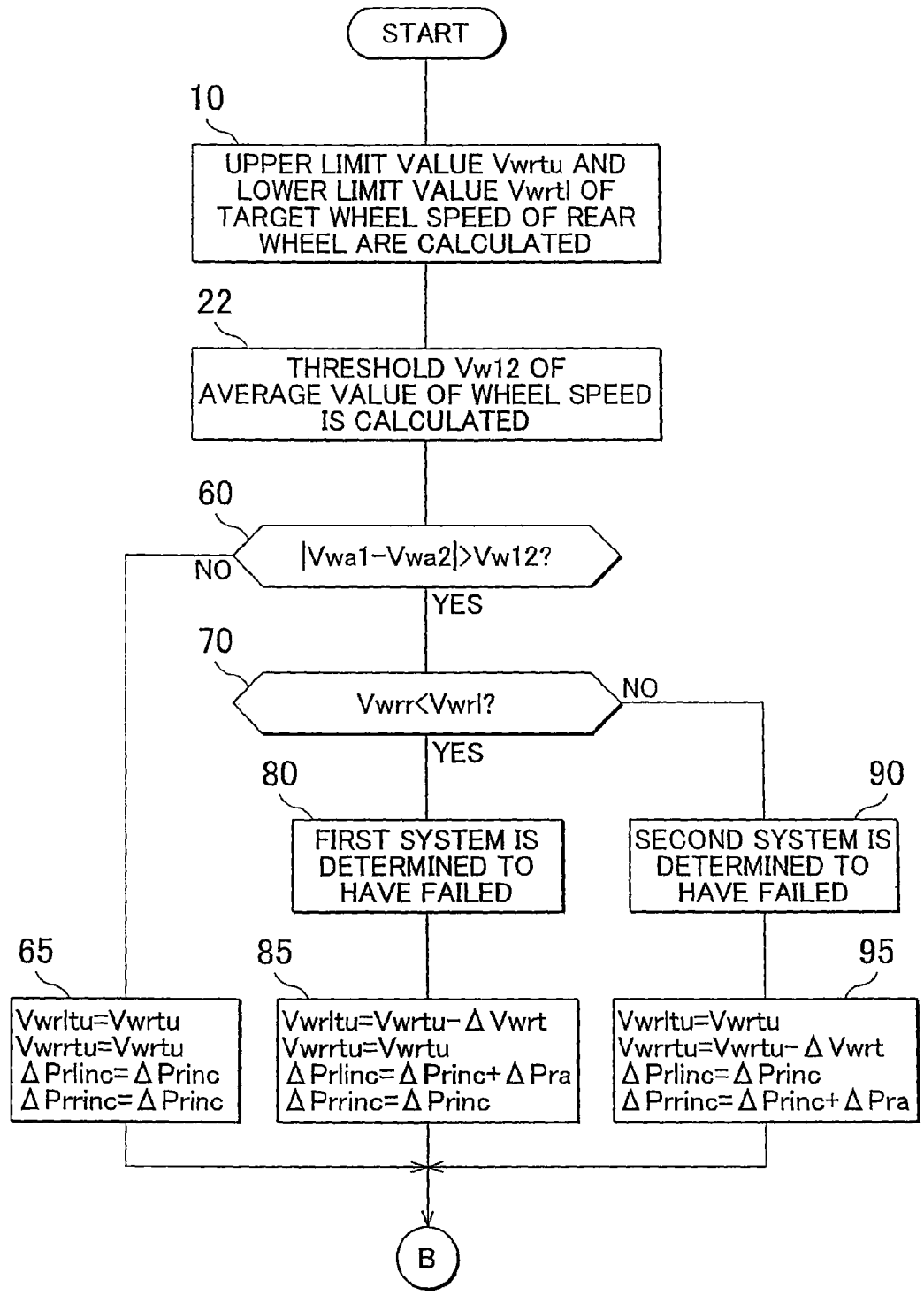
FIG. 9 is a flowchart illustrating the first half of the front-rear wheel distribution control routine for a brake force in the fifth embodiment of the brake force control apparatus for a vehicle in accordance with the invention.

FIG. 9 is a flowchart illustrating the first half of the front-rear wheel distribution control routine for a brake force in the fifth embodiment of the brake force control apparatus for a vehicle in accordance with the invention.

In the fifth embodiment, once step 10 is completed, step 22 is implemented instead of step 20, and once step 22 is completed, the control advances to step 60.

In step 22, a threshold Vw12 for the average value of wheel speed for failure determination is calculated on the basis of vehicle speed V, vehicle deceleration Vd, and vehicle deceleration gradient Vdd. In this case, the threshold Vw12 for the difference of the average speed is calculated so as to assume a higher value when the vehicle speed V, vehicle deceleration Vd, and vehicle deceleration gradient Vdd are large.

In step 60, the first average value Vwa1 of the wheel speed Vwfr of the right front wheel and the wheel speed Vwrl of the left rear wheel is calculated and the second average value Vwa2 of the wheel speed Vwfl of the left front wheel and the wheel speed Vwrr of the right rear wheel is calculated. It is then determined whether the absolute value of the difference Vwa1−Vwa2 of the first average value Vwa1 and the second average value Vwa2 exceeds a threshold Vw12, that is, whether or not the first or second system has failed. When a negative determination is made, the control advances to step 65, and when a positive determination is made, the control advances to step 70. Other steps of the fifth embodiment, that is, steps 70 to 280, are implemented in the same manner as in the second embodiment.

Therefore, according to the fifth embodiment, where both the first system and the second system are normal, the absolute value of the difference Vwa1−Vwa2 of the first average value Vwa1 and the second average value Vwa2 is equal to or less than the threshold Vw12. Therefore, in step 60, a negative determination is made, that is, it is determined that both the first system and the second system are normal.

Further, in the fifth embodiment, where either of the first and second systems fails, the absolute value of the difference Vwa1−Vwa2 of the first average value Vwa1 and the second average value Vwa2 exceeds the threshold Vw12. Therefore, a positive determination is made in step 60. In step 70, it is determined whether or not the wheel speed Vwrr of the right rear wheel is lower than the wheel speed Vwrl of the left rear wheel.

Figure 17:
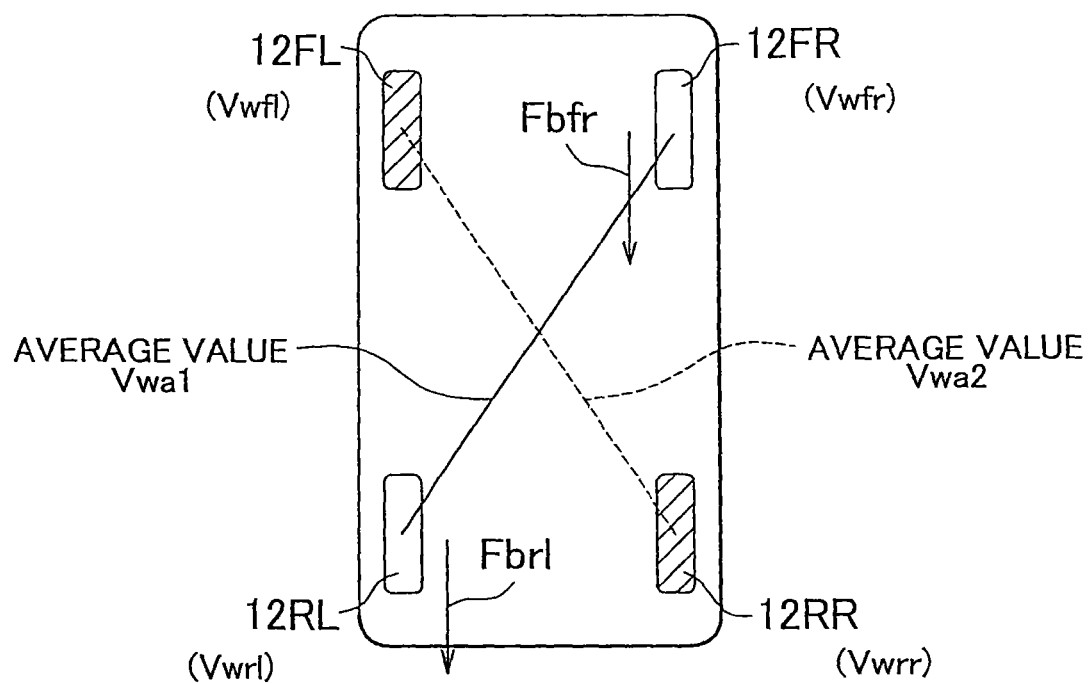
FIG. 17 illustrates the essentials of failure determination in the fifth embodiment.

For example, when the first system is normal and the second system fails, the required brake forces Fbfr and Fbrl are generated in the right front wheel and left rear wheel as shown in FIG. 17, but no required brake force is generated in the left front wheel and right rear wheel. As a result, when the amount of brake operation performed by the driver is large, the wheel speed Vwrl of the left rear wheel becomes lower than the wheel speed Vwrr of the right rear wheel. Therefore, a negative determination is made in step 70, and the second system is thus determined in step 90 to have failed.

By contrast, where the second system is normal, but the first system fails, the required brake force is generated in the left front wheel and right rear wheel, but no required brake force is generated in the right front wheel and left rear wheel. As a result, when the amount of brake operation performed by the driver is large, the wheel speed Vwrl of the left rear wheel is higher than the wheel speed Vwrr of the right rear wheel.

Therefore, a positive determination is made in step 70, and the first system is thus determined in step 80 to have failed.

Sixth Embodiment

Figure 10:
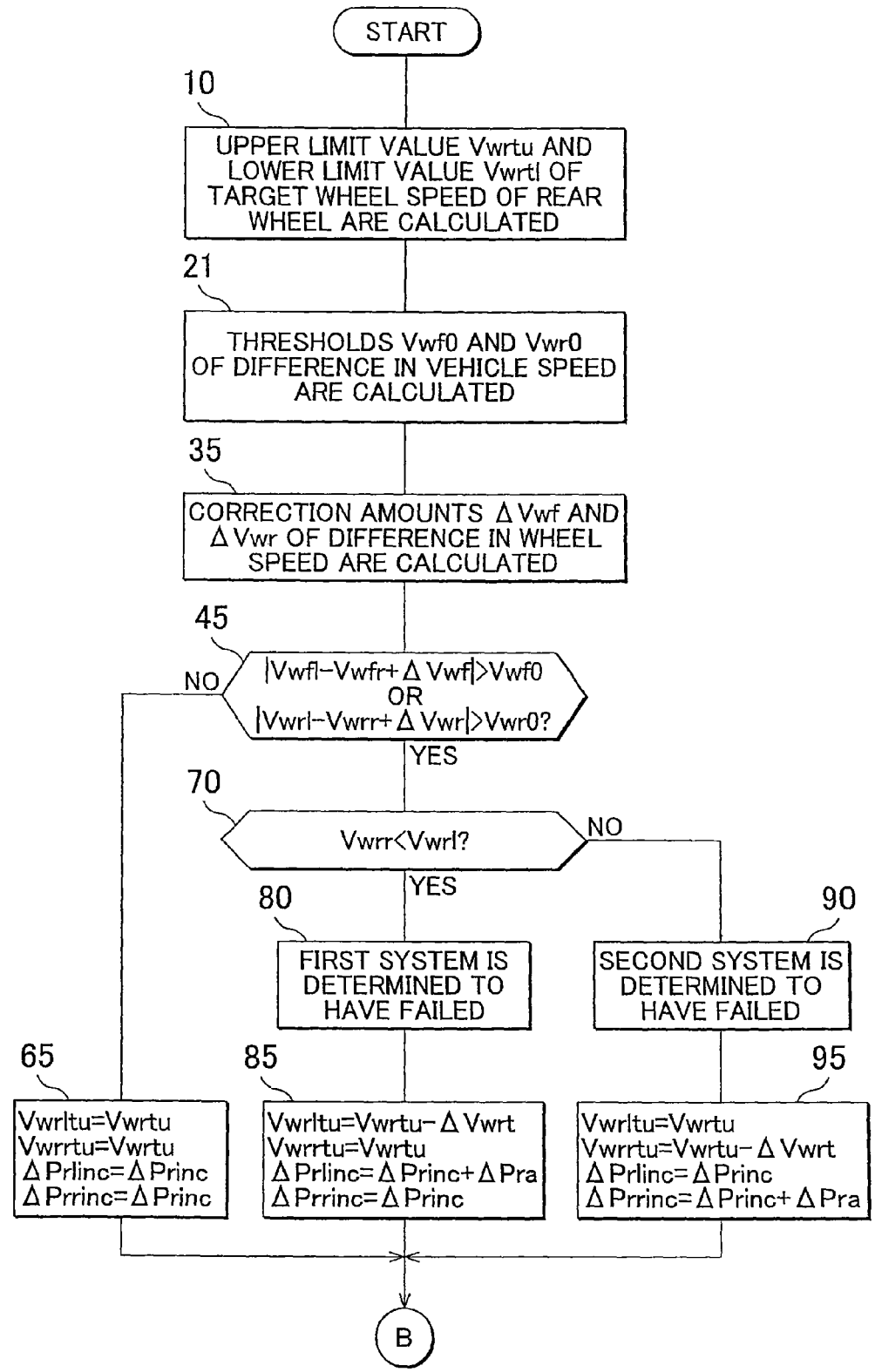
FIG. 10 is a flowchart illustrating the front-rear wheel distribution control routine for a brake force in the sixth embodiment of the brake force control apparatus according to the invention that is configured as a modification example of the third embodiment.

FIG. 10 is a flowchart illustrating the first half of the front-rear wheel distribution control routine for a brake force in the sixth embodiment of the brake force control apparatus according to the invention that is configured as a modification example of the third embodiment.

In the sixth embodiment, once step 10 is completed, step 21 is implemented in the same manner as in the third embodiment. Once step 21 is completed, the control advances to step 35, and once step 35 is completed, the control advances to step 45.

In step 35, a correction amount $\Delta Vwf$ for correcting the difference in wheel speed between the left and right front wheels caused by the difference in turning radius and a correction amount $\Delta Vwr$ for correcting the difference in wheel speed between the left and right rear wheels are calculated on the basis of the vehicle yaw rate $\gamma$ and vehicle tread.

In step 45, it is determined whether the absolute value of the difference $Vwfl-Vwfr+\Delta Vwf$ in wheel speed between the left and right front wheels after the correction is greater than the threshold $Vwf0$, or whether the absolute value of the difference $Vwrl-Vwrr+\Delta Vwr$ in wheel speed between the left and right rear wheels after the correction is greater than the threshold $Vwr0$. In other words, whether or not the first system or the second system has failed is determined on the basis of the value of the difference in wheel speed between the left and right wheels after the correction. Where a negative determination is made, the control advances to step 65, and where a positive determination is made, the control advances to step 70. Other steps of the sixth embodiment, that is, steps 70 to 280, are implemented in the same manner as in the above-described second embodiment.

Therefore, according to the sixth embodiment, the effect produced by the error of the difference in wheel speed between the left and right front wheels caused by the difference in turning radius can be eliminated when it is determined whether or not the first or second system has failed. Therefore, it is not only possible to obtain the operation effect similar to that of the above-described third embodiment, but the determination of whether or not the first or second system has failed can be made more accurately than in the third embodiment.

Seventh Embodiment

Figure 11:
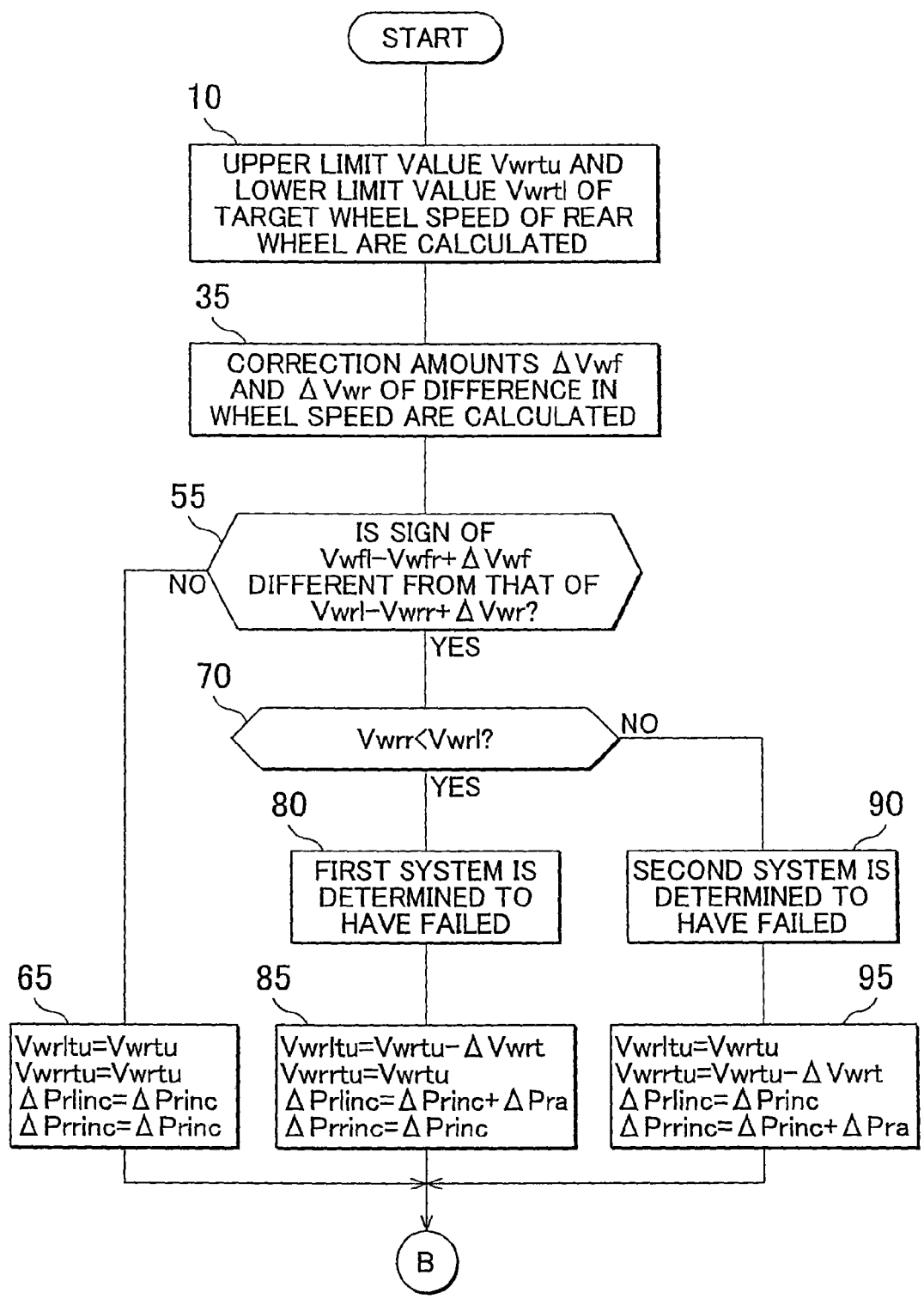
FIG. 11 is a flowchart illustrating the front-rear wheel distribution control routine for a brake force in the seventh embodiment of the brake force control apparatus according to the invention that is configured as a modification example of the fourth embodiment.

FIG. 11 is a flowchart illustrating the first half of the front-rear wheel distribution control routine for a brake force in the seventh embodiment of the brake force control apparatus according to the invention that is configured as a modification example of the fourth embodiment.

In the seventh embodiment, once step 10 is completed, step 35 is implemented in the same manner as in the sixth embodiment. Once step 35 is completed, the control advances to step 55.

In step 55, it is determined whether the sign of the difference $Vwfl-Vwfr+\Delta Vwf$ in wheel speed between the left and right front wheels after the correction is different from the sign of the difference $Vwrl-Vwrr+\Delta Vwr$ in wheel speed between the left and right rear wheels after the correction, that is, whether or not the first or second system has failed. Where a negative determination is made, the control advances to step 65, and where a positive determination is made, the control advances to step 70. Other steps of the seventh embodiment, that is, steps 70 to 280, are implemented in the same manner as in the above-described second embodiment.

Therefore, according to the seventh embodiment, the effect produced by the error of the difference in wheel speed between the left and right front wheels caused by the difference in turning radius can be eliminated when it is determined whether or not the first or second system has failed, in the same manner as in the sixth embodiment. Therefore, it is not only possible to obtain the operation effect similar to that of the above-described fourth embodiment, but the determination of whether or not the first or second system has failed can be made more accurately than in the fourth embodiment.

Eighth Embodiment

Figure 12:
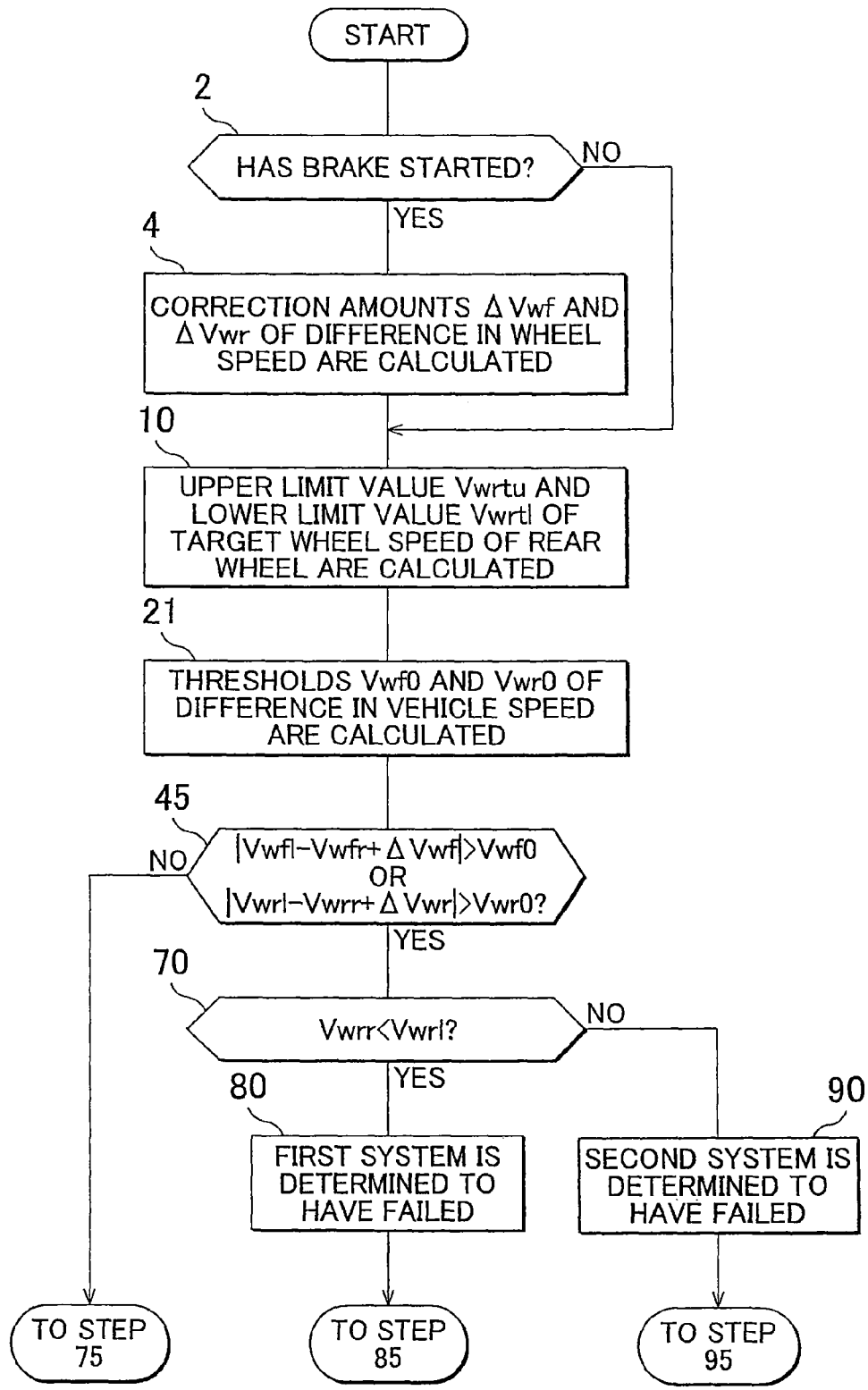
FIG. 12 is a flowchart illustrating the front-rear wheel distribution control routine for a brake force in the eighth embodiment of the brake force control apparatus according to the invention that is configured as a modification example of the sixth embodiment.

FIG. 12 is a flowchart illustrating the first half of the front-rear wheel distribution control routine for a brake force in the eighth embodiment of the brake force control apparatus according to the invention that is configured as a modification example of the sixth embodiment.

In the eighth embodiment, step 2 is implemented prior to step 10. In step 2, it is determined whether or not the front-left distribution control of brake force is being started. Where a negative determination is made, the control advances to step 10, and where a positive determination is made, the control advances to step 4.

In step 4, the difference $Vwfl-Vwfr$ in wheel speed between the left and right front wheels is calculated as a correction amount $\Delta Vwf$ for correcting the difference in wheel speed between the left and right front wheels caused by the difference in turning radius. Likewise, the difference $Vwrl-Vwrr$ in wheel speed between the left and right rear wheels is calculated as a correction amount $\Delta Vwr$ for correcting the difference in wheel speed between the left and right rear wheels caused by the difference in turning radius.

Once step 4 is completed, step 10 is implemented in the same manner as in the first embodiment, and once step 10 is completed, the control advances to step 21 in the same manner as in the sixth embodiment. However, once step 21 is completed, the control advances to step 45, without implementing step 35.

Therefore, according to the eighth embodiment, the effect produced by the error of the difference in wheel speed between the left and right front wheels caused by the difference in turning radius can be eliminated when it is determined whether or not the first or second system has failed, in the same manner as in the sixth embodiment.

Further, according to the eighth embodiment, since the correction amounts $\Delta Vwf$ and $\Delta Vwr$ are calculated on the basis of the difference in wheel speed between the left and right wheels when the front-rear wheel distribution control of brake force is started, means for obtaining information such as a yaw rate $\gamma$ of the vehicle is not required. The operation effect similar to that of the sixth embodiment can be obtained with a configuration that is simpler and less expensive than that of the sixth embodiment.

As follows from the explanation above, according to the above-described embodiments, when the first and second systems are normal, the front-rear wheel distribution control of brake force can be performed to obtain the preferred distribution of brake force of the rear wheels in relation to the front wheels, and when the first or second system fails, the brake pressure of the rear wheel of the normal system can be prevented from being reduced. Therefore, when the front-rear wheel distribution control of brake force is performed in a state in which the first or second system has failed, the brake force of the rear wheel of the normal system can be prevented from being reduced. As a result, it is possible to inhibit the increase in excess yaw momentum acting on the vehicle or the decrease in vehicle deceleration.

In particular, according to the above-described embodiments, when the first or second system has failed, the reduction of brake pressure is inhibited by maintaining the brake pressure of the rear wheel of the normal system. Therefore, the increase in excess yaw momentum acting on the vehicle or the decrease in vehicle deceleration can be inhibited more reliably and effectively than, for example, when the reduction of brake pressure is inhibited by reducing the reduction amount of brake pressure.

Further, according to the above-described embodiments, when the first or second system has failed, the upper limit value Vwrltu or Vwrrtu of the target wheel speed of the rear wheel of the failed system is reduced. Therefore, a positive determined is performed faster in step 130 or the like than in the case when the upper limit of the target wheel speed of the rear wheel of the failed system is not reduced. As a result, the brake pressure of the rear wheel of the failed system can be rapidly increased. Therefore, even when the increase in brake force is not complete due to a failure, the brake force of the rear wheel of the failed system can be rapidly increased. Therefore, the increase in excess yaw momentum acting on the vehicle or the decrease in vehicle deceleration can be effectively inhibited.

In particular, according to the above-described embodiments, the correction amount ΔVwrt for correcting by reduction the upper limit value Vwrltu or Vwrrtu of the target wheel speed is set to vary according to vehicle speed V and the like. Therefore, the upper limit value Vwrltu or Vwrrtu of the target wheel speed can be corrected by reduction according to travel conditions of the vehicle more accurately than in the case where the correction amount ΔVwrt is constant and does not depend on the vehicle speed V or the like.

Further, according to the above-described embodiments, when the first or second system has failed, the target pressure increase gradient ΔPrlinc or ΔPrrinc of the rear wheel of the failed system is increased. Therefore, the brake pressure of the rear wheel of the failed system can be increased in step 140 or 240 more rapidly than in the case in which the target pressure increase gradient of the rear wheel of the failed system is not increased. As a result, even when the increase in brake force is not complete due to a failure, the brake force of the rear wheel of the failed system can be rapidly increased. Therefore, the increase in excess yaw momentum acting on the vehicle or the decrease in vehicle deceleration can be effectively inhibited.

In particular, according to the above-described embodiments, the correction amount ΔPra for correcting by increase the target pressure increase gradient ΔPrlinc or ΔPrrinc is set to vary according to vehicle speed V and the like. Therefore, the target pressure increase gradient ΔPrlinc or ΔPrrinc can be corrected by increase according to travel conditions of the vehicle more accurately than in the case where the correction amount ΔPra is constant and does not depend on the vehicle speed V or the like.

According to the above-described first, third, fifth, sixth, and eighth embodiments, a threshold (Vw0 and the like) for determining the presence of a failure is set to vary according to vehicle speed V or the like. Therefore the presence of a failure can be determined according to travel conditions of the vehicle with an accuracy higher than that in the case where the threshold Vw0 and the like is constant and does not depend on the vehicle speed V and the like.

In particular, according to the above-described first and second embodiments, the presence of a failure is determined on the basis of the size and sign of the difference in wheel speed between the left front and rear wheels and the difference in wheel speed between the right front and rear wheels. Therefore, the possibility of erroneously determining the presence or absence of a failure due to the effect of the difference in wheel speed caused by the difference in turning radius of the left and right wheels is lower than that in the third and fourth embodiments.

In particular, according to the above-described second embodiment, the presence of a failure is determined on the basis of the relationship between signs of the difference in wheel speed between the left front and rear wheels and the difference in wheel speed between the right front and rear wheels. Therefore, the failure presence determination is more robust against variations in vehicle loading state or unintended variations in front-rear distribution of brake force caused by the fade phenomenon in front wheels than in the first embodiment.

Further, according to the third and fourth embodiments or sixth to eighth embodiments, the presence of a failure is determined on the basis of the size and sign of the difference in wheel speed between the left and right front wheels and the difference in wheel speed between the left and right rear wheels. Therefore, the possibility of erroneously determining the presence or absence of a failure in the case where the speed of left and right wheels changes abruptly due to a sharp drop in road level is lower than that in other embodiments.

In particular, according to the above-described fourth and seventh embodiments, the presence of a failure is determined on the basis of the relationship between signs of the difference in wheel speed between the left and right front wheels and the difference in wheel speed between the left and right rear wheels. Therefore, the possibility of erroneously determining the presence or absence of a failure due to the effect of the difference in wheel speed caused by the difference in turning radius between the left and right wheels when the vehicle is in the turning state is lower than that in the third and fourth embodiments. Further, the possibility of erroneously determining the presence or absence of a failure due to the difference in ground contact load between the left and right wheels or the difference in turning radius is lower than that in the third, sixth, and eighth embodiments.

The invention is explained above in detail with reference to the specific embodiments thereof, but the invention is not limited to the above-described embodiments and it is obvious to a person skilled in the art that various other embodiments are possible within the scope of the invention.

For example, in the above-described embodiments, the slip degree index value is a wheel speed, but the slip degree, that is, slip amount or slip ratio, of wheels can also use the vehicle speed as a reference speed.

Further, in the above-described embodiments, the front-rear wheel distribution control of brake force is continued even when failure determination of the first or second system is repeatedly performed. However, the front-rear wheel distribution control of brake force may be interrupted and modified when failure determination of the first or second system has been continuously performed a predetermined number of times or when failure determination of the first or second system has been repeatedly performed for a predetermined time.

Further, in the above-described embodiments, where the first or second system is determined to have failed, the upper limit values Vwrltu or Vwrrtu of the target wheel speed of the rear wheels of the failed system is decreased and the target pressure increase gradient ΔPrlinc or ΔPrrinc is increased. However, the embodiments may be modified so that only either the reduction of the upper limit value of the target wheel speed or the increase in the target pressure increase gradient is performed.

Further, in the above-described embodiments, whether or not the first or second system has failed is determined on the basis of individual parameters, but a modification is possible such that the determination modes of at least two embodiments are combined and the system is determined to have failed when failure determination is positive in both modes.

Further, in the above-described first embodiment, it is determined in step 170 whether or not the difference between the wheel speed Vwrr of the right rear wheel and the wheel speed Vwfr of the right front wheel exceeds the threshold Vw0 for the difference. This determination of step 170 may be replaced with the determination of whether or not the difference between the wheel speed Vwfl of the left front wheel and the wheel speed Vwfr of the right front wheel exceeds the threshold Vw0 for the difference. Further, the determination of step 170 may be replaced with the determination of whether or not the difference between the wheel speed Vwrr of the right rear wheel and the wheel speed Vwfl of the left front wheel exceeds the threshold Vw0 for the difference.

Likewise, it is determined in step 270 whether or not the difference between the wheel speed Vwrl of the left rear wheel and the wheel speed Vwfl of the left front wheel exceeds the threshold Vw0 for the difference. This determination of step 270 may be replaced with the determination of whether or not the difference between the wheel speed Vwfr of the right front wheel and the wheel speed Vwfl of the left front wheel exceeds the threshold Vw0 for the difference. Further, the determination of step 270 may be replaced with the determination of whether or not the difference between the wheel speed Vwfl of the left front wheel and the wheel speed Vwrr of the right rear wheel exceeds the threshold Vw0 for the difference.

Further, in the above-described third embodiment, it is determined in step 40 whether the absolute value of the difference Vwfl−Vwfr in wheel speed between the left and right front wheels exceeds the threshold Vwf0 for the difference or whether or not the absolute value of the difference Vwrl−Vwrr in wheel speed between the left and right rear wheels exceeds the threshold Vwr0 for the difference. This determination of step 40 may be replaced with the determination of whether or not the absolute value of the difference Vwrr−Vwfr in wheel speed between the right front and rear wheels exceeds the threshold Vw0 for the difference or whether or not the absolute value of the difference Vwfl−Vwfr in wheel speed between the left front and rear wheels exceeds the threshold Vwr0 for the difference.

Further, in the above-described first to fourth embodiments, no correction is performed with respect to the difference in wheel speed between the left and right wheels that is caused by the difference in turning radius. However, these embodiments are also preferred to be modified so that when the vehicle is in a state of turning, the wheel speed from which the effect of turning radius has been excluded is calculated for each wheel and steps 130, 150, 170, and the like are implemented on the basis of the calculation results. The wheel speed from which the effect of turning radius has been excluded may be, for example, a wheel speed value recalculated to a position of any one of the left and right wheels of the vehicle, such as the center on the left or right side of the vehicle, or a position therebetween.

Further, in the above-described fifth embodiment, the sum index value calculated in step 60 is the first average value Vwf1 and the second average value Vwr2 of the wheel speeds of the wheels of the first and second systems. However, the sum index value may be modified to be the first and second sum of wheel speeds of the wheels of the first and second systems.

Further, in the above-described third, sixth, and eighth embodiments, the thresholds Vwf0 and Vwr0 of the difference in vehicle speed are calculated with respect to the front and rear wheels, but in a possible modification one common threshold is calculated for the front and rear wheels.

Further, in the above-described second and fourth embodiments, the elapsed time T is the time elapsed since the point of time in which the correction of the target slip degree has been started. However, the elapsed time T may be the time elapsed since the point of time in which the front-rear wheel distribution control of brake force has been started or the time elapsed since the point of time in which the brake control has been started by the driver, as long as this time includes the time elapsed since the point of time in which the correction of the target slip degree has been started.

Further, the eighth embodiment is configured as a modification example of the sixth embodiment by replacing step 35 of the sixth embodiment with steps 2 and 4 of the eighth embodiment. However, step 35 of the seventh embodiment may be replaced with steps 2 and 4 of the eighth embodiment.

The brake force control apparatus for a vehicle may be configured to include an inhibition unit that inhibits the reduction of brake pressure by the front-rear wheel distribution control of brake force. The brake force control apparatus for a vehicle may be also provided with a calculation unit that calculates the values or signs of the above-mentioned thresholds and a comparison unit that compares the thresholds or signs. In other words, the brake force control apparatus for a vehicle may be configured to be provided with units performing each processing.

The invention claimed is:

1. A brake force control apparatus for a vehicle that has a brake device provided with a brake pressure control system for a left front wheel and a right rear wheel and a brake pressure control system for a right front wheel and a left rear wheel, and performs front-rear wheel distribution control of brake force by individually controlling the brake pressure of the left and right rear wheels so as to obtain a target relationship between a slip degree index value of the left and right rear wheels and a slip degree index value of the front wheels during braking, the brake force control apparatus comprising:

a controller configured to, detect a failure in one of the brake pressure control systems when either of a difference in slip degree index value between one wheel of one of the systems and one wheel of the other of the systems and a difference in slip degree index value between the other wheel of the one system and the other wheel of the other system exceeds a threshold for the difference, determine a system without the failure that includes a wheel with a lower wheel speed from among the two wheels for which the difference in slip degree index value exceeds the threshold for the difference, and inhibit a reduction of brake pressure by the front-rear wheel distribution control of brake force to maintain a brake pressure of a rear wheel of the system without the failure.

2. The brake force control apparatus for a vehicle according to claim 1, wherein the wheel speed is a wheel speed from which an effect of turning radius has been excluded.

3. The brake force control apparatus for a vehicle according to claim 1, wherein the difference in slip degree index value between the one wheel of the one system and the one wheel of the other system is a difference in slip degree index value between the left front and rear wheels, and the difference in slip degree index value between the other wheel of the other system and the other wheel of the one system is a difference in slip degree index value between the right front and rear wheels.

4. The brake force control apparatus for a vehicle according to claim 1, wherein the difference in slip degree index value between the one wheel of the one system and the one wheel of the other system is a difference in slip degree index value between the left and right front wheels; and the difference in slip degree index value between the other wheel of the other system and the other wheel of the one system is a difference in slip degree index value between the left and right rear wheels.

5. The brake force control apparatus for a vehicle according to claim 4, wherein:

the controller corrects the difference in slip degree index value on the basis of a parameter relating to a turning radius of the vehicle.

6. The brake force control apparatus for a vehicle according to claim 1, wherein the controller increases a brake pressure by the front-rear wheel distribution control of brake force with respect to the rear wheel on a side opposite, in a left-right direction, to the rear wheel for which the reduction of brake pressure by the front-rear wheel distribution control of brake force is inhibited.

7. The brake force control apparatus for a vehicle according to claim 1, wherein the controller interrupts the front-rear wheel distribution control of brake force when the reduction of brake pressure by the front-rear wheel distribution control of brake force is continuously inhibited for a time equal to or longer than a reference time.

8. The brake force control apparatus for a vehicle according to claim 1, wherein the controller prohibits the reduction of brake pressure by the front-rear wheel distribution control of brake force.

9. The brake force control apparatus for a vehicle according to claim 1, the threshold for the difference is set to change according to at least one of a vehicle speed, a vehicle deceleration, and a variation rate of vehicle deceleration.

10. The brake force control apparatus for a vehicle according to claim 1, wherein:

the controller determines that either of the one system and the other system has failed when the reduction of brake pressure by the front-rear wheel distribution control of brake force is inhibited.

11. The brake force control apparatus for a vehicle according to claim 1, wherein:

the controller determines that the system including a wheel with a higher wheel speed, from among the two wheels for which the threshold for the difference in slip degree index value is exceeded, has failed when the reduction of brake pressure by the front-rear wheel distribution control of brake force is inhibited.

12. The brake force control apparatus for a vehicle according to claim 1, wherein:

the controller determines that the system including a wheel with a higher wheel speed, from among the left and right rear wheels, has failed when the reduction of brake pressure by the front-rear wheel distribution control of brake force is inhibited.

13. The brake force control apparatus for a vehicle according to claim 1, wherein the controller is configured to determine that a master cylinder pressure is equal to or higher than a control start determination reference value before detecting the failure in one of the brake pressure control systems.

14. The brake force control apparatus for a vehicle according to claim 1, wherein the controller is configured to perform the detection of the failure in one of the brake pressure control systems and the inhibition of the reduction of brake pressure by the front-rear wheel distribution control of brake force in a control routine, and to repeatedly execute the control routine with a predetermined period until a master cylinder pressure is equal to or less than a control end determination reference value.

15. A brake force control method for a vehicle that uses a brake device provided with a brake pressure control system for a left front wheel and a right rear wheel and a brake pressure control system for a right front wheel and a left rear wheel to perform front-rear wheel distribution control of brake force by individually controlling the brake pressure of the left and right rear wheels so as to obtain a target relationship between a slip degree index value of the left and right rear wheels and a slip degree index value of the front wheels during braking, comprising:

detecting a failure in one of the brake pressure control systems when if either of a difference in slip degree index value between one wheel of one of the systems and one wheel of the other of the systems and a difference in slip degree index value between the other wheel of the one system and the other wheel of the other system exceeds a threshold for the difference, determining a system without the failure that includes a wheel with a lower wheel speed from among the two wheels for which the difference in slip degree index value exceeds the threshold for the difference, and inhibiting a reduction of brake pressure by the front-rear wheel distribution control of brake force with respect to maintain a brake pressure of a rear wheel of the system without the failure.

16. The brake force control method for a vehicle according to claim 15, further comprising detecting that a master cylinder pressure is equal to or higher than a control start determination reference value before the detecting the failure in one of the brake pressure control systems.

17. The brake force control method for a vehicle according to claim 15, further comprising performing the detection of the failure in one of the brake pressure control systems and the inhibition of the reduction of brake pressure by the front-rear wheel distribution control of brake force in a control routine in a control routine, and repeatedly executing the control routine with a predetermined period until a master cylinder pressure is equal to or less than a control end determination reference value.

* * * * *